United States Patent
Dean-Hendricks et al.

(10) Patent No.: US 9,810,441 B2
(45) Date of Patent: Nov. 7, 2017

(54) HVAC CONTROLLER WITH INDOOR AIR QUALITY SCHEDULING

(75) Inventors: Barbara Dean-Hendricks, Woodbury, MN (US); Joshua Jacque Edberg, Maple Grove, MN (US); David Quam, St. Louis Park, MN (US); Amy Ragland, Brooklyn Center, MN (US)

(73) Assignee: Honeywell International Inc., Morris Plains, NJ (US)

( * ) Notice: Subject to any disclaimer, the term of this patent is extended or adjusted under 35 U.S.C. 154(b) by 878 days.

(21) Appl. No.: 13/403,878

(22) Filed: Feb. 23, 2012

(65) Prior Publication Data

US 2013/0226352 A1    Aug. 29, 2013

(51) Int. Cl.
 G05D 23/00    (2006.01)
 F24F 11/00    (2006.01)

(52) U.S. Cl.
 CPC ...... *F24F 11/0009* (2013.01); *F24F 11/0086* (2013.01); *F24F 2011/0072* (2013.01); *F24F 2011/0091* (2013.01)

(58) Field of Classification Search
 CPC .............................................. F24F 2011/0072
 See application file for complete search history.

(56) References Cited

U.S. PATENT DOCUMENTS

| | | |
|---|---|---|
| 2,495,861 A | 1/1950 | Newton |
| 2,882,383 A | 4/1959 | Boyd, Jr. et al. |
| 3,454,078 A | 7/1969 | Elwart |
| 3,635,044 A | 1/1972 | Heth |
| 3,948,438 A | 4/1976 | Vlasak |
| 4,011,735 A | 3/1977 | Martz et al. |
| 4,075,864 A | 2/1978 | Schrader |
| 4,136,822 A | 1/1979 | Felter |
| 4,267,967 A | 5/1981 | Beck et al. |
| 4,356,962 A | 11/1982 | Levine |
| 4,369,916 A | 1/1983 | Abbey |
| 4,408,711 A | 10/1983 | Levine |

(Continued)

FOREIGN PATENT DOCUMENTS

| | | |
|---|---|---|
| JP | 2000039200 | 2/2000 |
| JP | 2000234786 A | 8/2000 |
| JP | 2000283051 A | 10/2000 |

OTHER PUBLICATIONS

Honeywell Inc., "Residential Ventilation Control," Project Report, 32 pages, May 1993.

(Continued)

*Primary Examiner* — Ryan Jarrett
(74) *Attorney, Agent, or Firm* — Seager, Tufte & Wickhem, LLP

(57) ABSTRACT

An HVAC controller, such as a thermostat, may be configured to allow a user to set and/or select schedule time period in which one or more indoor quality units (e.g. humidification, dehumidification, ventilation, etc.) will or will not operate, and/or will operated but using different settings. In some cases, the schedule time periods available for selection may correspond to the time periods of a programmable temperature schedule of the HVAC controller, but this is not required. In some instances, the HVAC controller may allow a user to select which indoor air quality units will or will not operate, and/or what settings the indoor air quality units will operate, during a user's vacation.

18 Claims, 24 Drawing Sheets

(56) References Cited

U.S. PATENT DOCUMENTS

| | | | |
|---|---|---|---|
| 4,452,391 A | 6/1984 | Chow | |
| 4,467,617 A | 8/1984 | Morgan, Jr. et al. | |
| 4,502,625 A | 3/1985 | Mueller | |
| 4,571,950 A | 2/1986 | Nariai et al. | |
| 4,595,139 A | 6/1986 | Levine | |
| 4,684,060 A | 8/1987 | Adams et al. | |
| 4,718,021 A | 1/1988 | Timblin | |
| 4,773,587 A | 9/1988 | Lipman | |
| 4,776,385 A | 10/1988 | Dean | |
| 4,838,482 A | 6/1989 | Vogelzang | |
| 4,930,460 A | 6/1990 | Aihara et al. | |
| 4,941,325 A | 7/1990 | Nuding | |
| 4,951,473 A | 8/1990 | Levine et al. | |
| 5,020,332 A | 6/1991 | Nakatsuno et al. | |
| 5,131,236 A | 7/1992 | Wruck et al. | |
| 5,142,880 A | 9/1992 | Bellis | |
| 5,151,236 A | 9/1992 | Azzara et al. | |
| 5,179,524 A | 1/1993 | Parker et al. | |
| 5,192,273 A | 3/1993 | Bierman | |
| 5,239,834 A | 8/1993 | Travers | |
| 5,241,253 A | 8/1993 | Schlangen | |
| 5,282,770 A | 2/1994 | Shibata | |
| 5,325,286 A | 6/1994 | Weng et al. | |
| 5,415,617 A | 5/1995 | Kraus | |
| 5,433,377 A | 7/1995 | Sodo et al. | |
| 5,492,273 A | 2/1996 | Shah | |
| 5,547,017 A | 8/1996 | Rudd | |
| 5,579,993 A | 12/1996 | Ahmed et al. | |
| 5,707,005 A | 1/1998 | Kettler et al. | |
| 5,727,887 A | 3/1998 | Webster et al. | |
| 5,742,516 A | 4/1998 | Olcerst | |
| 5,791,408 A | 8/1998 | Seem | |
| 5,862,982 A | 1/1999 | Federspiel | |
| 5,881,806 A | 3/1999 | Rudd | |
| 5,884,806 A | 3/1999 | Boyer et al. | |
| 5,971,846 A | 10/1999 | Cho et al. | |
| 6,079,627 A | 6/2000 | Kettler | |
| 5,547,017 B1 | 11/2000 | Rudd | |
| 6,161,764 A | 12/2000 | Jatnieks | |
| 6,170,271 B1 | 1/2001 | Sullivan | |
| 6,179,627 B1 | 1/2001 | Daly et al. | |
| 6,318,639 B1 | 11/2001 | Toth | |
| 6,415,617 B1 | 7/2002 | Seem | |
| 6,431,268 B1 | 8/2002 | Rudd | |
| 6,467,695 B1 | 10/2002 | Riley et al. | |
| 6,514,138 B2 | 2/2003 | Estepp | |
| 6,609,967 B2 | 8/2003 | Sharp et al. | |
| 6,658,581 B1 | 12/2003 | Takahashi et al. | |
| 6,698,219 B2 | 3/2004 | Sekhar et al. | |
| 6,988,671 B2 | 1/2006 | DeLuca | |
| 7,222,494 B2 | 5/2007 | Peterson et al. | |
| 8,087,593 B2 | 1/2012 | Leen | |
| 8,112,181 B2 | 2/2012 | Remsburg | |
| 8,141,373 B2 | 3/2012 | Peterson et al. | |
| 8,219,249 B2 | 7/2012 | Harrod et al. | |
| 8,239,066 B2 | 8/2012 | Jennings et al. | |
| 2002/0072322 A1 | 6/2002 | Sharp et al. | |
| 2002/0090908 A1 | 7/2002 | Estepp | |
| 2003/0146289 A1 | 8/2003 | Sekhar et al. | |
| 2004/0222307 A1 | 11/2004 | DeLuca | |
| 2004/0262410 A1* | 12/2004 | Hull | 236/91 R |
| 2007/0056299 A1 | 3/2007 | Shankweiler | |
| 2007/0130969 A1 | 6/2007 | Peterson et al. | |
| 2009/0140056 A1 | 6/2009 | Leen | |
| 2009/0140062 A1 | 6/2009 | Amundson et al. | |
| 2009/0143880 A1 | 6/2009 | Amundson et al. | |
| 2009/0143916 A1 | 6/2009 | Boll et al. | |
| 2009/0143918 A1 | 6/2009 | Amundson et al. | |
| 2010/0070089 A1* | 3/2010 | Harrod et al. | 700/277 |
| 2010/0107071 A1 | 4/2010 | Pavlak et al. | |
| 2010/0107072 A1 | 4/2010 | Mirza et al. | |
| 2010/0107112 A1 | 4/2010 | Jennings et al. | |
| 2010/0212879 A1 | 8/2010 | Schnell et al. | |
| 2011/0184565 A1* | 7/2011 | Peterson | 700/278 |
| 2012/0012662 A1* | 1/2012 | Leen | F24F 11/0012 236/51 |
| 2012/0145802 A1 | 6/2012 | Peterson et al. | |
| 2012/0181010 A1 | 7/2012 | Schultz et al. | |
| 2013/0325192 A1* | 12/2013 | Shah | F24F 11/006 700/276 |

OTHER PUBLICATIONS

Honeywell Inc., "Field Demonstration of a Residential Ventilation Controller," EPRI Research Project 3512-04, Final Report, Mar. 1995.

Nutech Energy Systems Inc., "Lifebreath Clean Air Furnace "Electric" Clean Air Furnace Manual Model 60ELE" pp. 1-18, downloaded Feb. 5, 2004.

http://content.honeywell.com/yourhome/ptc-thermostats/PC8900faq.htm, Honeywell, Your Home Expert—Programmable Thermostats: FAQ, 10 pages, printed Feb. 4, 2004.

Honeywell, "Perfect Climate Comfort Center," Quick Guide, 6 pages, 1996.

http://www.aricycler.com/frv.html, "AriCycler—The Indoor Air Quality Solution," 2 pages, printed Feb. 4, 2004.

http://www.aircycler.com/instfrv.htm, "AirCycler FR-V Installation," 2 pages, printed Feb. 4, 2004.

http://www.aircycler.com/instfrv.htm, "FR—Installation," 3 pages, printed Feb. 4, 2004.

Ashrae Standard, "Ventilation and Acceptable Indoor Air Quality in Low-Rise Residential Buildings," BSR/ASRAE Standard 62.2P, Fourth Public Review, Nov. 2002.

Lipidex Corporation, "AirCycler, Improving Indoor Air Quality," 23 pages, printed Sep. 8, 2003.

Aprilaire, "Choose a better ventilation solution for today's tight homes," Ventilation Control System Model 8126, 6 pages, 2003.

Lifebreath, "Current Events Fall Edition," 4 pages, Sep. 1999.

Nutech Energy Systems Inc., "Programmable ventilation Controller 99-105," Operation and Installation Manual, 6 pages, downloaded Feb. 4, 2004.

Honeywell Inc., "Perfect Climate Comfort Center," Owners Guide, 44 pages, 1998.

Aprilaire, "Ventilation Controller," Model 8120 Ventilation Controller, Owner's Manual, 2 pages, downloaded Feb. 4, 2004.

Nutech Energy Systems Inc., "Operating Your Ventilation Dehumidistat," Operating the 99-250 Ventilation Dehumidistat, 2 pages, downloaded Feb. 4, 2004.

* cited by examiner

HVAC CONTROLLER WITH INDOOR AIR QUALITY SCHEDULING

TECHNICAL FIELD

The present disclosure relates generally to HVAC systems, and more particularly, to controllers that may be used for controlling HVAC systems.

BACKGROUND

Heating, ventilation, and/or air conditioning (HVAC) systems are often used to control the comfort level within a building or other structure. HVAC systems typically include an HVAC controller that controls various HVAC components of the HVAC system in order to affect and/or control the temperature within the building. Some HVAC systems include one or more HVAC components that are useful for controlling the indoor air quality within the building, such as ventilation components, humidification components, and/or dehumidification components. In many cases, such indoor air quality components are controlled in accordance with a fixed setting that can be manually adjusted by the user.

SUMMARY

This disclosure relates generally to HVAC systems, and more particularly, to HVAC controllers that may be used for controlling HVAC systems. In some cases, the HVAC system may include a building controller (e.g. a thermostat) and at least one indoor air quality component such as, for example, a humidifier unit, a dehumidifier unit, and/or a ventilation unit. In one example, an HVAC controller may be configured to control one or more components of an HVAC system of a building. The HVAC controller may include a user interface, a memory, a programmable operating schedule including two or more time periods and one or more temperature set points for each of the two or more time periods stored in the memory, an I/O block for sending and/or receiving signals to and/or from the one or more components of the HVAC system, and a controller. The controller may be coupled to the user interface, the memory, and the I/O block, and may be configured to generate one or more signals to control one or more components of the HVAC system in accordance with the predetermined operating schedule. The controller may be configured to allow a user to select at least a first time period of the two or more time periods of the predetermined operating schedule to control at least one of the one or more indoor air quality components of the HVAC system differently than during at least one other of the two or more time periods of the predetermined operating schedule.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which.

Figure 1:
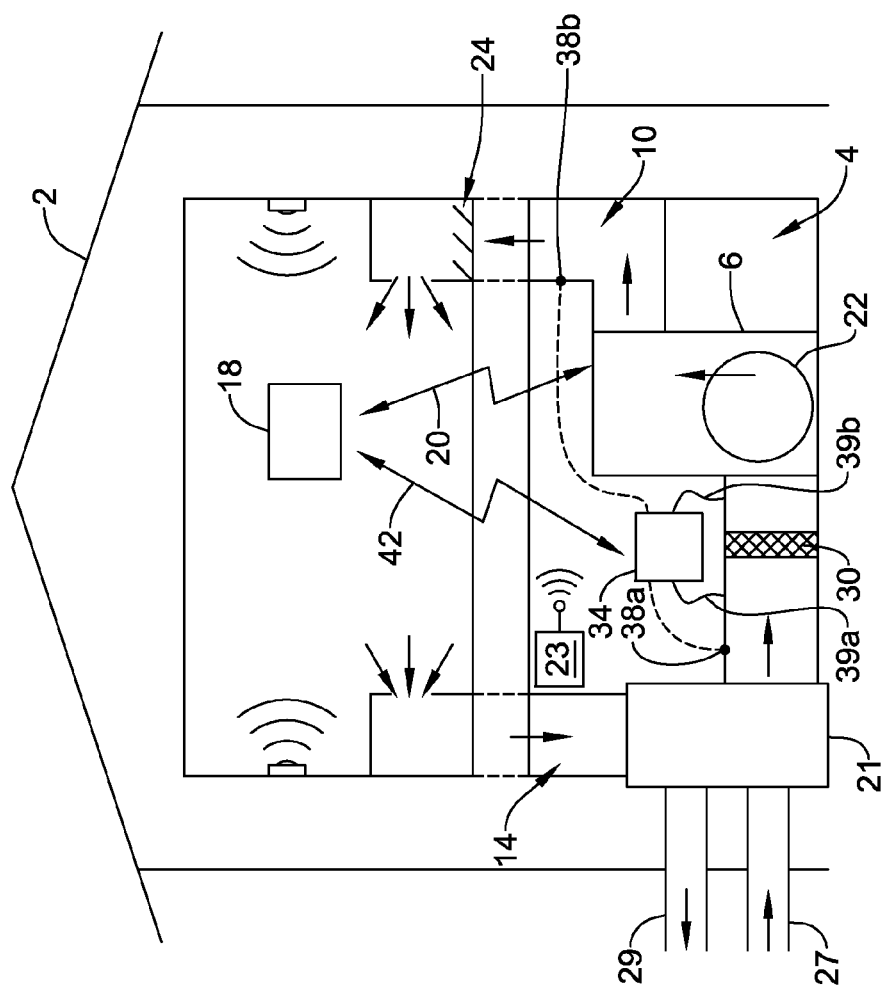
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative of the claimed disclosure.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and at least one HVAC controller 18. The one or more HVAC components 6 may include, but are not limited to, a furnace, a heat pump, an electric heat pump, a geothermal heat pump, an electric heating unit, an air conditioning unit, a ventilation unit, a humidifier, a dehumidifier, an air exchanger, an air cleaner, a damper, a valve, and/or the like.

It is contemplated that the HVAC controller(s) 18 may be configured to control the comfort level and, in some cases, the air quality conditions in the building or structure by activating and deactivating the HVAC component(s) 6 in a controlled manner. The HVAC controller(s) 18 may be configured to control the HVAC component(s) 6 via a wired or wireless communication link 20. The HVAC controller(s) 18 may wirelessly communicate with the one or more HVAC components(s) 6 following a wireless protocol such as, for example, cellular communication, ZigBee, Bluetooth, WiFi, IrDA, dedicated short range communication (DSRC), EnOcean, or any other suitable wireless protocols, as desired.

In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERAT- ING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system 4 shown in FIG. 1, the HVAC component(s) 6 may provide heated air (and/or cooled air) via the ductwork 10 throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components 6 to an appropriate room and/or zone in the building or other structure. The dampers 24 may be particularly useful in zoned HVAC systems, and may be used to control which zone(s) receives conditioned air from the HVAC component(s) 6.

Additionally, in some cases, the HVAC component(s) 6 may exhaust stale air and/or supply fresh air to the building or structure 2 via the ductwork 10 located throughout the building 2. For example, in some cases, the HVAC component(s) 6 may include a ventilation unit 21, which may draw outside air into the building via an outside air intake 27 and at the same time expel inside air via an inside air outlet 29. In some cases, a heat exchanger (not explicitly shown) may be provided to exchange heat between the outgoing inside air and the incoming outside air. In some cases, the ventilation unit 21 may include additional fans and/or blowers to facilitate the exchange of stale air from within the building 2 with fresh air supplied from outside the building 2. The ventilation unit 21 may include a ventilation controller (not explicitly shown), that may receive ventilation commands from, for example, the HVAC controller(s) 18, and in response, may activate and/or deactivate the various components of the ventilation unit 21 to implement the received ventilation commands. In some cases, the ventilation unit 21 may be coupled to additional ductwork which may draw state air from different locations within the building 2 to be exhausted from the building via the air outlet 29. These are just some examples. In some cases, the ventilation unit 21 may be controlled according to a predetermined schedule or predetermined set point stored in the HVAC controller. In some cases, the HVAC controller 18 may be configured to allow a user to select certain time periods in which the ventilation unit 21 will operate or not operate, and/or at what speed the ventilation unit 21 will operate during each time period. Additionally, the HVAC controller 18 may be configured to allow a user to specify when the ventilation unit 21 may operate at a reduced level to conserve energy while at the same time maintaining the indoor air quality within the building 2 at an acceptable level such as for example, in accordance with a user's vacation schedule.

The HVAC components(s) 6 may also provide humidification and/or dehumidification within the building or structure 2. In some cases, humidification and/or dehumidification may be provided by a humidifier unit and/or a dehumidifier unit, as applicable, in a controlled manner according to a predetermined schedule or predetermined set point stored in the HVAC controller. In some cases, the HVAC controller 18 may be configured to allow a user to select certain time periods in which the humidification unit and/or dehumidification unit will operate or not operate, and/or at what setpoint the humidification unit and/or dehumidification unit will operate during each time period. Additionally, the HVAC controller 18 may be configured to allow a user to specify when the humidification unit and/or dehumidification unit may operate at a reduced level to conserve energy while at the same time maintaining the indoor air quality within the building 2 at an acceptable level such as for example, in accordance with a user's vacation schedule.

The HVAC system 4 may also include an optional communications gateway or other device 23 that may allow one or more of the HVAC components 6, as described herein, to communicate wirelessly with one another in accordance with a wireless communications protocol such as, for example, cellular communication, ZigBee, Bluetooth, WiFi, IrDA, dedicated short range communication (DSRC), EnOcean, or any other suitable wireless protocols, as desired. In some cases, the communications gateway 23 may facilitate communication between the various HVAC components 6 over a local area network (LAN), a wide area network (WAN), or the internet. These are just some examples.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.–return air temp.). For the cooling mode, the delta T may be calculated by subtracting the discharge air temperature from the return air temperature (e.g. delta T=return air temp.–discharge air temp.).

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

In some cases, the equipment interface module 34 may include a first temperature sensor 38*a* located in the return (incoming) air duct 14, and a second temperature sensor 38*b* located in the discharge (outgoing or supply) air duct 10. Alternatively, or in addition, the equipment interface module 34 may include a differential pressure sensor including a first pressure tap 39*a* located in the return (incoming) air duct 14, and a second pressure tap 39*b* located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

Figure 2:
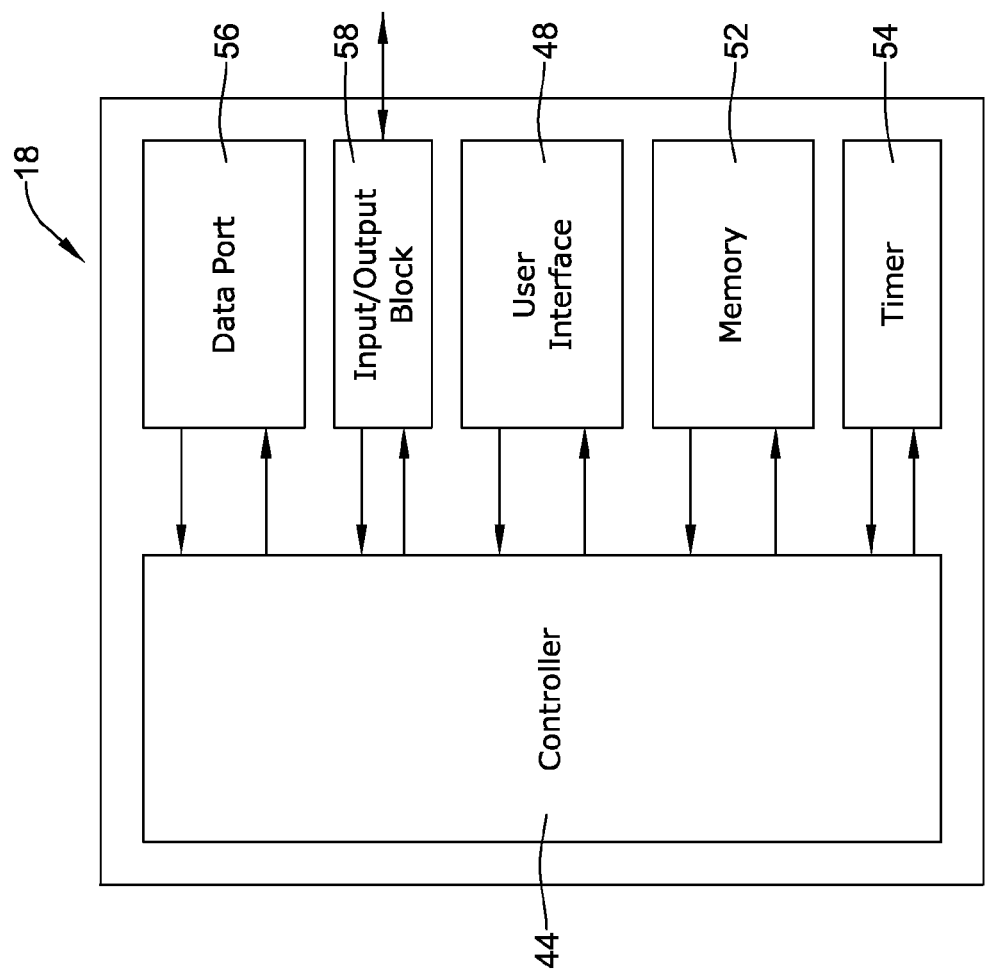
FIG. 2 is a schematic view of an illustrative HVAC controller.

FIG. 2 is a schematic view of an illustrative HVAC controller 18. In some instances, HVAC controller 18 may be a thermostat, but this is not required. In the illustrative embodiment of FIG. 2, HVAC controller 18 includes a controller (e.g. microprocessor, microcontroller, etc.) 44, a user interface 48, a memory 52, and a timer 54. The timer 54 may be integral to the controller 44 or may be provided as a separate component. In some cases, the HVAC controller 18 may optionally include an input/output block (I/O block) 58 for receiving one or more signals from the HVAC system 4 and/or for providing one or more control signals to the HVAC system 4. For example, the I/O block 58 may communicate with one or more HVAC components 6 of the HVAC system 4. Additionally, in some cases, the I/O block 58 may communicate with another controller, which is in communication with one or more HVAC components 6 of the HVAC system 4, such as a zone control panel in a zoned HVAC system, equipment interface module (EIM) 34 or any other suitable building control device.

The controller 44 may operate in accordance with an algorithm that controls or at least partially controls one or more HVAC components 6 of an HVAC system such as, for example, HVAC system 4 shown in FIG. 1. The controller 44 may, for example, operate in accordance with an algorithm that provides temperature set points, starting and/or ending times, and the like. In many cases, the controller 44 may be configured to read a temperature sensed by the temperature sensor and control the one or more HVAC components 6 of the HVAC system 4 in to maintain a desired temperature set point within the building 2 in accordance with a programmable schedule stored in the memory 52 of the HVAC controller 18. Alternatively, or in addition, the controller 44 may be configured to control the one or more HVAC components 6 including one or more indoor air quality units such as, for example a ventilation unit, a humidification unit, and/or a dehumidification unit, to maintain a desired indoor air quality within the building 2, sometimes in accordance with a programmable schedule stored in the memory 52 of the HVAC controller 18.

In some cases, the controller 44 may be programmed to control the one or more indoor air quality units according to a programmable operating schedule that includes one or more time periods. The programmable operating schedule may include the same time period as the programmable operating schedule of the temperature setpoints (heating and/or cooling setpoints), or they may be different time periods. In either case, The controller 44 may be programmed to allow a user to select at least a first time period of the programmable operating schedule to control at least one of the one or more indoor air quality units (e.g. ventilation unit, humidifier unit, dehumidifier unit) differently than during at least one other of time period of the programmable operating schedule. For example, the controller 44 may be programmed to allow a user to select a time period in which an indoor quality unit will operate and a different time period in which the indoor air quality unit will not operate (or will operate in a different mode, at a different speed, at a different setpoint, or at some other different setting). In some cases, the controller 44 may be programmed to allow a user to select which indoor air quality units will or will not operate during each time period of the programmable operating schedule, and/or during a user's vacation schedule. Additionally, the controller 44 may be programmed to allow a user to select which indoor air quality units may operate at a reduced level to conserve energy while at the same time maintaining indoor air quality for a period of time identified by the user such as, for example, the user's vacation schedule.

In the illustrative embodiment of FIG. 2, user interface 48 may be any suitable user interface that permits HVAC controller 18 to display and/or solicit information, as well as accept one or more user interactions with the HVAC controller 18. For example, the user interface 48 may permit a user to enter data such as temperature set points, humidity set points, starting times, ending times, diagnostic limits, conditions under which diagnostic limits may be suspended, responses to alerts, requests for ventilation, and/or the like. In some cases, as discussed herein, the HVAC controller 18 may be configured to receive and accept a user's input that identifies at least one time period in which one or more indoor air quality units will not operate, or will operate in a different mode, at a different speed, at a different setpoint, or at some other different setting. In some cases, the at least one time period identified by the user in which one or more indoor air quality units may not operate may correspond to one of the time periods of a programmable temperature set point operating schedule. Alternatively, or in addition, the at least one time period identified by the user in which one or more indoor air quality units may operate in a different mode or may not operate may correspond to a user's vacation time period.

In some cases, user interface 48 may include a display and a distinct keypad. A display may be any suitable display. In some instances, a display may include or may be a liquid crystal display (LCD), and in some cases a fixed segment display or a dot matrix LCD display. If desired, user interface 48 may be a touch screen LCD panel that functions as both display and keypad. In some instances, a touch screen LCD panel may be adapted to solicit values for a number of operating parameters and/or to receive such values, but this is not required.

The memory 52 of the illustrative HVAC controller 18 may be in communication with the controller 44. Memory 52 may be used to store any desired information, such as the aforementioned control algorithm, set points, schedule times, diagnostic limits such as, for example, differential pressure limits, delta T limits, and the like. Memory 52 may be any suitable type of storage device including, but not limited to, RAM, ROM, EPROM, flash memory, a hard drive, and/or the like. In some cases, controller 44 may store information within memory 52, and may subsequently retrieve the stored information.

In some cases, as illustrated in FIG. 2, HVAC controller 18 may include a data port 56. Data port 56 may be a wireless port such as a Bluetooth™ port or any other wireless protocol. In other cases, data port 56 may be a wired port such as a serial port, a parallel port, a CATS port, a USB (universal serial bus) port, and/or the like. In some instances, data port 56 may be a USB port and may be used to download and/or upload information from a USB flash drive or some other data source. Other remote devices may also be employed, as desired.

Data port 56 may be configured to communicate with controller 44 and may, if desired, be used to upload information to controller 44 and/or download information from controller 44. Information that can be uploaded and/or downloaded may include, for example, values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be transferred to other similar thermostats, hastening their programming process. In some cases, data port 56 may be used to upload and/or download information pertaining to an HVAC dealer or contractor, if desired. In some cases, data port 56 may be used to download data stored within the memory 52 for analysis. For example, data port 56 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XNL, and/or Adobe PDF® file, but this is certainly not required.

Figure 3:
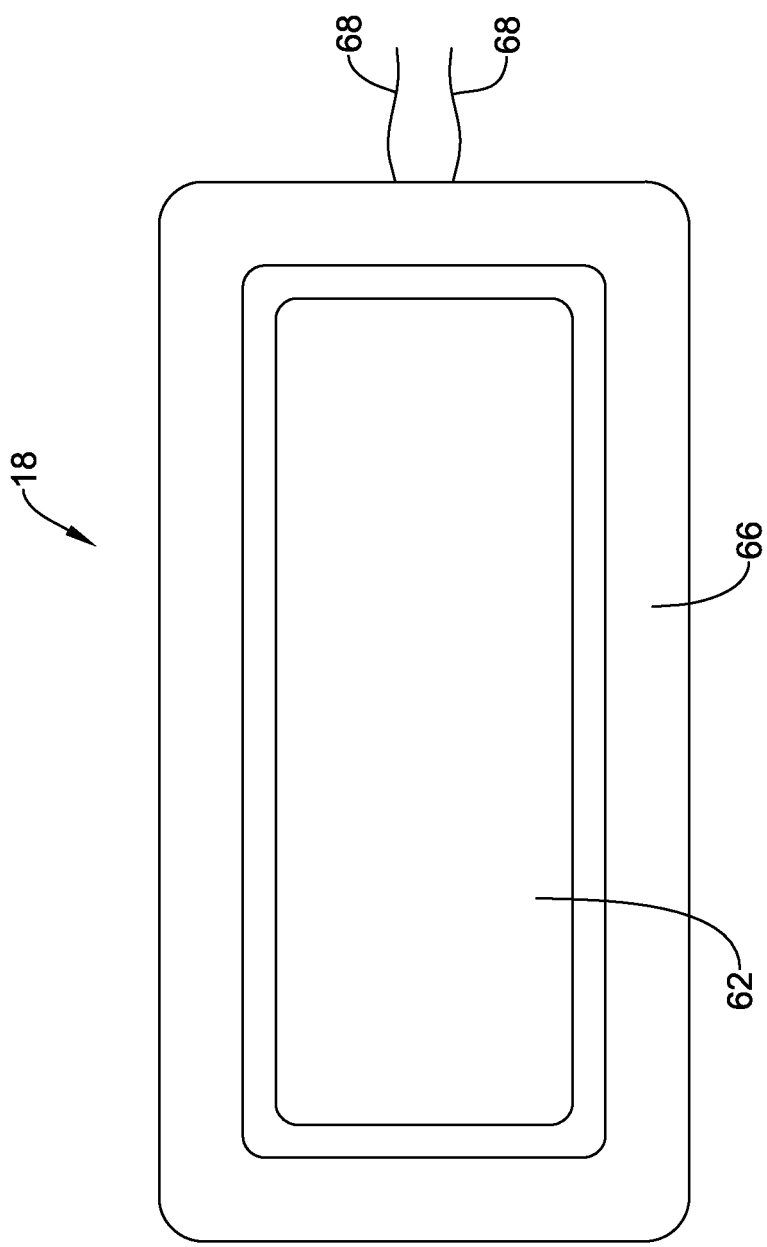
FIG. 3 is a front view of an illustrative HVAC controller.

FIG. 3 is a front view of an illustrative HVAC controller 18. In some cases, HVAC controller 18 may be configured to provide substantial display and/or programming functionality. In the illustrative embodiment of FIG. 3, HVAC controller 18 may include a display 62 that is disposed within a housing 66 but viewable externally from the housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, images, and the like to be displayed anywhere on the LCD, rather than being confined to predetermined locations such as is the case with a fixed segment type of LCD display. Housing 66 may be formed of any suitable material, such as a polymeric material. In some cases, the housing 66 may be formed such that it defines a data port 56 (see FIG. 2). In some cases, the housing 66 may also include suitable wiring and/or other electrical connections 68 such that the HVAC controller 18 may be electrically coupled to the HVAC system 4, but this is not required.

Figure 4:
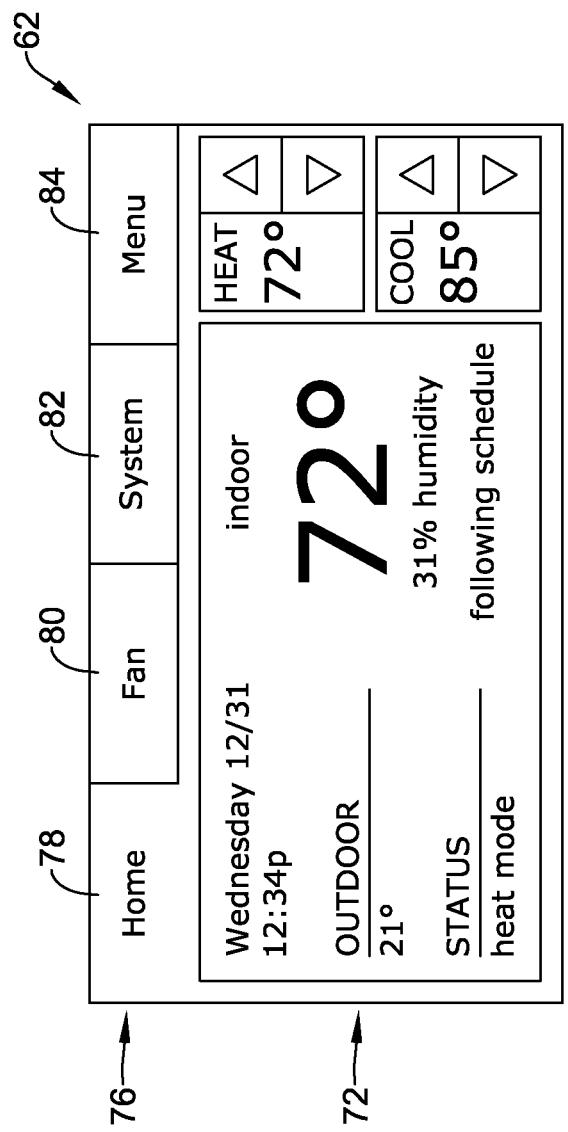
FIGS. 4-24 show several illustrative screens that may be displayed on the HVAC controllers of FIGS. 2 and 3 when in use.

FIGS. 4-24 show several illustrative screens that maybe displayed on the display 62 of the HVAC controller 18 of FIGS. 2 and 3 when in use. FIG. 4 shows an illustrative home screen 72 that may be displayed on the display 62 of an HVAC controller 18. Home screen 72 is an example of a screen that may be displayed after a user has pushed HOME button 78, or when no other data entry is underway for a period of time. In many cases, the illustrative home screen 72 of FIG. 4 may include a navigational bar 76 along the top. Navigational bar 76 may be considered as providing top level navigation. In some cases, if desired, navigational bar 76 may include one or more of a HOME button 78, a FAN button 80, a SYSTEM button 82 and/or a MENU button 84. In the illustrative embodiment, the user may access one or more menus from which the user may make a temperature set point change, a humidity set point change, an indoor air quality change, a programmable schedule change, a system mode change, a fan setting change, an installer set-up change, an exit/entry remote setting change, among others.

Figure 5:
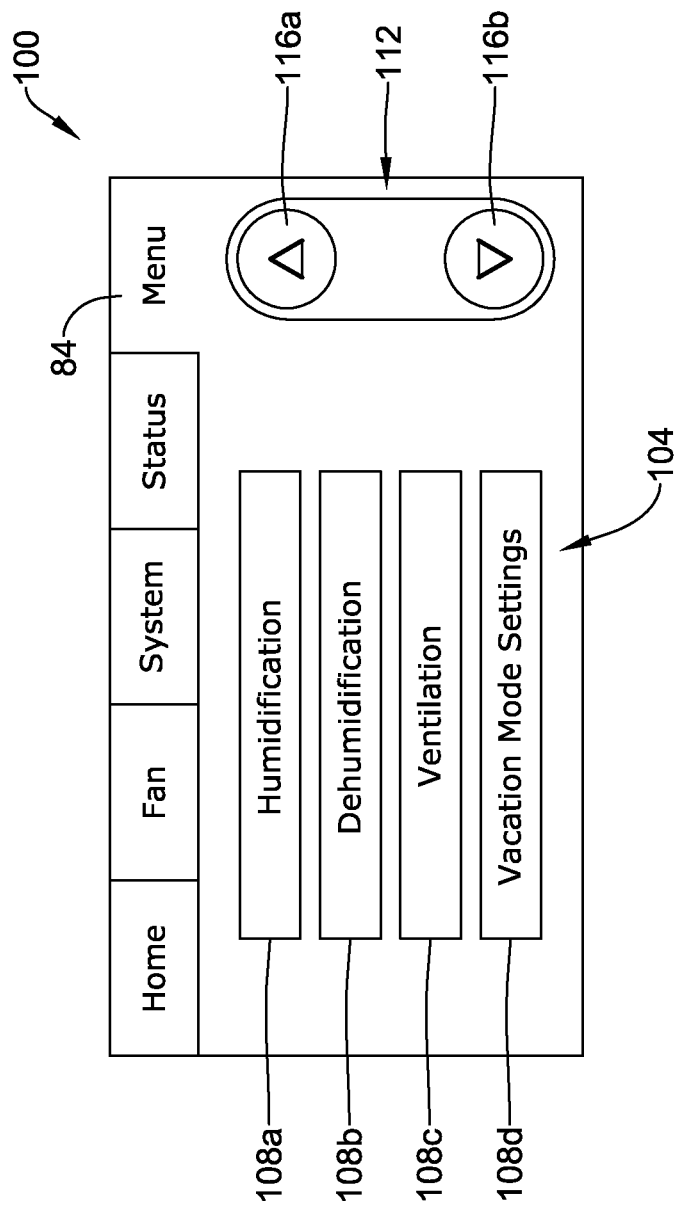

FIG. 5 shows an illustrative example of a menu screen 100 that may be displayed when a user selects the MENU button 84 on home screen 72 of FIG. 4. The illustrative menu screen 100 may include a table 104 that includes one or more selectable menu options 108*a-d* that may be selected by the user. In some cases, the table 104 may be a scrolling table, in which case the menu screen 100 may also include a scroll bar 112 including first and second arrows 116*a*, 116*b* that may facilitate a user in scrolling through the available menu options 108-*d*. In some cases, a first option 108*a* may be labeled "Humidification" and may correspond to the humidification settings for the HVAC system 4, a second option 108*b* may be labeled "Dehumidification" and may correspond to the dehumidification settings for the HVAC system, a third option 108*c* may be labeled "Ventilation" and may correspond to the ventilation settings for the HVAC system, and a fourth option 108*d* may be labeled "Vacation Mode" and may correspond to a vacation mode of the HVAC system 4. These are just some examples of different menu options that may be displayed on menu screen 100.

Figure 6:
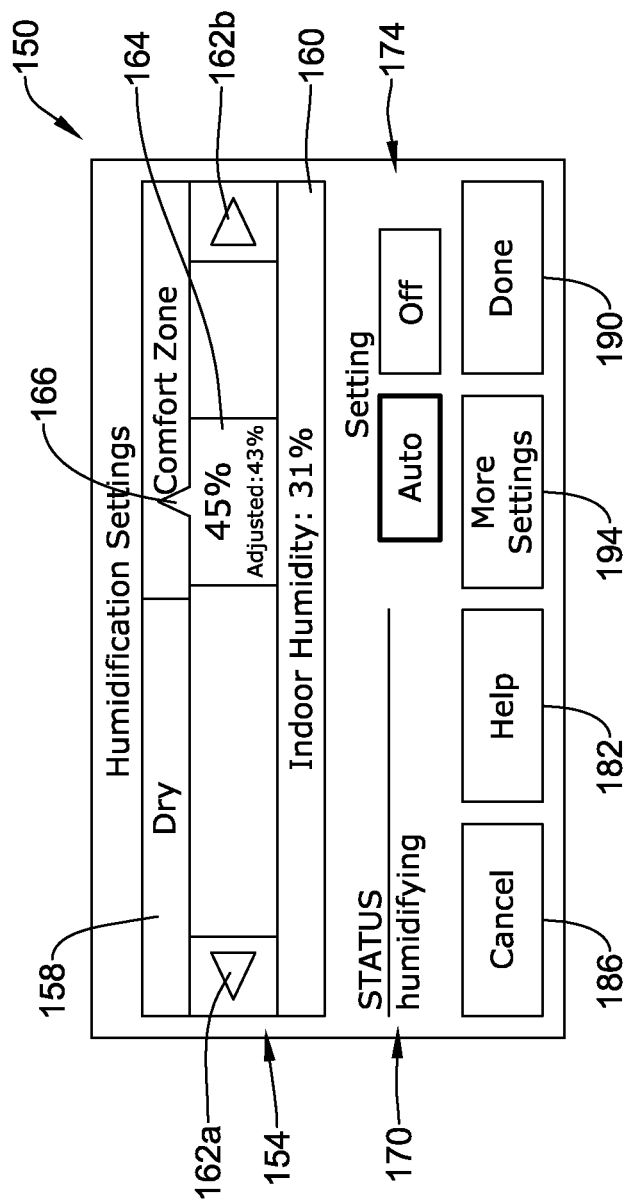
Figure 7:
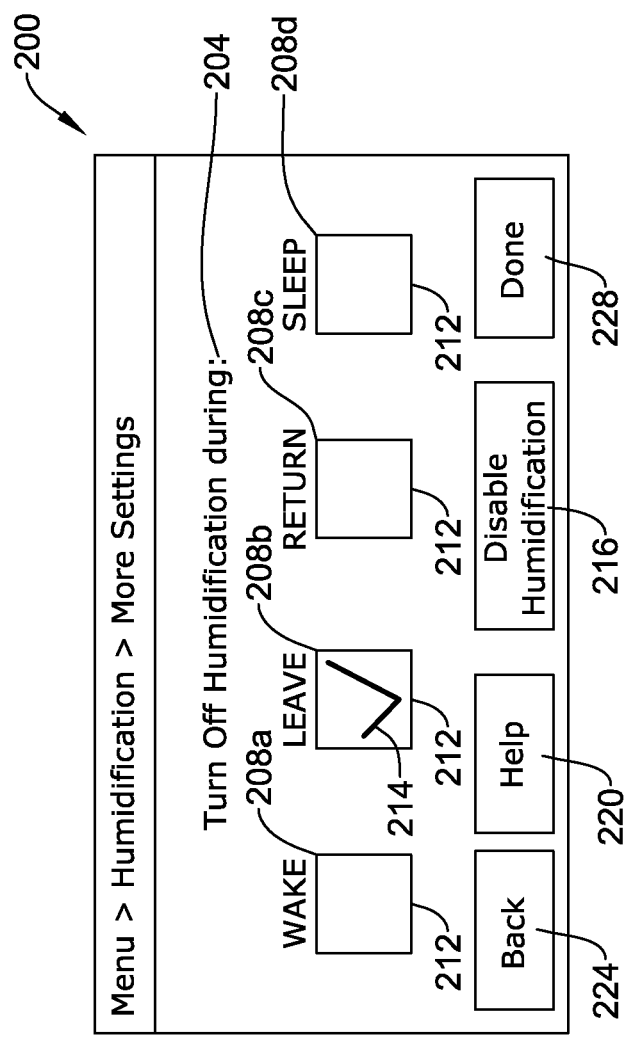

FIGS. 6-7 show several illustrative screens that may be displayed on the display 62 of the HVAC controller 18 in response to a user having selected the first option 108*a* labeled "Humidification." FIG. 6 shows a first humidification settings screen 150 through which a user may select and/or set a humidification setting. HVAC controller 18 may, for example, use the humidification setting in controlling a humidifier such as a whole-house humidifier. HVAC controller 18 may, for example, display a parameter adjustment element for use in adjusting an operating parameter such as a humidity set point. In some case, the parameter adjustment element may include an indicator that provides a qualitative indication for at least the current setting of the operating parameter. For example, as shown in the illustrative example provided in FIG. 6, screen 150 includes a slider bar 154 that has a scale 158, a display 160, and first and second arrows 162a, 162b. Scale 158 can be seen as including text describing the humidity setting in relative or qualitative terms such as "Dry" and "Comfort Zone." These particular terms are merely representative, as other terms may also be used. More generally, scale 158 may provide a qualitative context to a particular humidity value (e.g. 42%) so that a user unfamiliar with humidity values can still choose an appropriate humidity setting.

Display 160 may, as illustrated, provide a reminder that it is the indoor humidity setting that is being displayed as well as a current indoor humidity setting or current indoor humidity reading. Slider bar 154 may be seen as including an indicator button 164 that may be moved left and/or right using first and second arrow keys 162a, 162b, as desired. Indicator button 164 may, with respect to scale 158, provide a visual indication of the relative or qualitative humidity setting and may, if desired, include a pointer 166 that interacts with scale 158. Scale 158 may also provide upper and/or lower numerical limits for the displayed parameter, but this is not required. In some instances, indicator button 164 may include a numerical representation (quantitative value) of the indoor humidity setting.

Screen 150 may also indicate a current humidification status in a first region 170 and a current operational setting in a second region 174. For example, as shown, the current humidification status is indicated as "humidifying", and the current operational setting is indicated as "auto" (i.e. automatic). Additionally, screen 150 may include a Help button 182, a Cancel button 186, and a Done button 190. Help button 182, when selected, may cause HVAC controller 18 to display further information explaining humidification, providing clarification regarding screen options, and the like. Cancel button 186, when selected, may cause HVAC controller 18 to display a previous screen such as, for example menu screen 100 of FIG. 5. Done button 190, when selected, may inform HVAC controller 18 that the humidification setting has been completed, and as a result, may display menu screen 100 (FIG. 5) or, in some cases, home screen 72 (FIG. 4)

Screen 150 may also include a button 194 labeled "More Settings" or "Advanced Settings," that, when selected, may cause HVAC controller 18 to display a second humidification settings screen 200, such as shown in FIG. 7. As shown in FIG. 7, screen 200 may include a user prompt 204 that may prompt a user to select one or more time periods of a programmable operating schedule in which humidification may be turned off and a humidifier unit will not operate. A user may desire to turn off humidification or operate a humidification unit at a reduced level for energy conservation during certain periods due to noise of operation, energy costs during peak demand times, and/or according to user preference. As shown, screen 200 may include a one or more individually selectable options 208a-208d, each option 208a-208d corresponding to a time period of an operating schedule of the HVAC system 4 stored in the controller memory 52 of HVAC controller 18. In some cases, the operating schedule may correspond to the programmable schedule that is used to control the temperature set points of the HVAC controller 18. In other cases, the operating schedule may be a separately programmed schedule from the programmable schedule that is used to control the temperature set points of the HVAC controller 18.

In the example shown, screen 200 includes a first option 208a corresponding to a Wake period of the programmable schedule that is used to control the temperature set points of the HVAC controller 18. Screen 200 also include a second option 208b corresponding to a Leave period, a third option 208c corresponding to a Return period, and a fourth option 208d corresponding to a Sleep period. The options 208a-208d that may be displayed for selection by the user may be dependent on the operating schedule stored in the controller memory 52. It will be understood that fewer or more selectable options 208a-208d may be displayed corresponding to the number of time periods as determined by the programmable schedule. Additionally, it will be understood that different identifiers and/or labels may be used to identify each of the different time periods available for selection. For example, in some cases, a first option may correspond to Period 1, a second option may correspond to Period 2, and third option may correspond to Period 3, and so on. These are just some examples.

A user may select a least one (or more) of the displayed options 208a-208d, each of the different options 208a-208d corresponding to a different one of the time periods of the operating schedule. Selection of one option may not affect selection of another subsequent option. Each of the options 208a-208d may include a selection indicator box 212 that, when selected by a user, may include a checkmark, an X, may be filled in, greyed out, or otherwise highlighted to indicate selection of that option. For example, second 208b corresponding to the Leave time period of the operating schedule stored in the memory 52 of the HVAC controller 18, includes a check mark 214 indicating selection. In this example, humidification will continue during the time periods that correspond to the non-selected options, and humidification will be turned off or otherwise discontinued during the time periods that correspond to the selected option(s). According to the illustrative example shown in FIG. 7, humidification will continued during the Wake, Return and Sleep time periods of the schedule stored in the controller memory 52, but will be turned off during the Leave time period.

In some cases, a user may desire to disable a humidifier unit for all time periods. As such, screen 200 may include an option 216 that, when selected, may cause HVAC controller 18 to turn off the humidifier unit. In some cases, option 216 may have a toggle feature such that, when selected again, the HVAC controller 18 may enable humidification.

Screen 200 may also include a Help button 220, a Back button 224, and a Done button 228. Help button 220, when selected, may cause HVAC controller 18 to display further information explaining humidification, providing clarification regarding options, and the like. Back button 224, when selected, may cause HVAC controller 18 to display a previous screen such as, for example menu screen 100 of FIG. 5. Done button 228, when selected, may informs HVAC controller 18 that the humidification setting has been completed, and as a result, HVAC controller 18 may display menu screen 100 (FIG. 5) or, in some cases, home screen 72 (FIG. 4). While screen 200 shows an example where that allows a user to select those time periods when the humidifier unit will not operate, it should be understood that a similar screen may be provided that allows a user to select those time period when the humidifier unit will be enabled and may operate.

Figure 8:
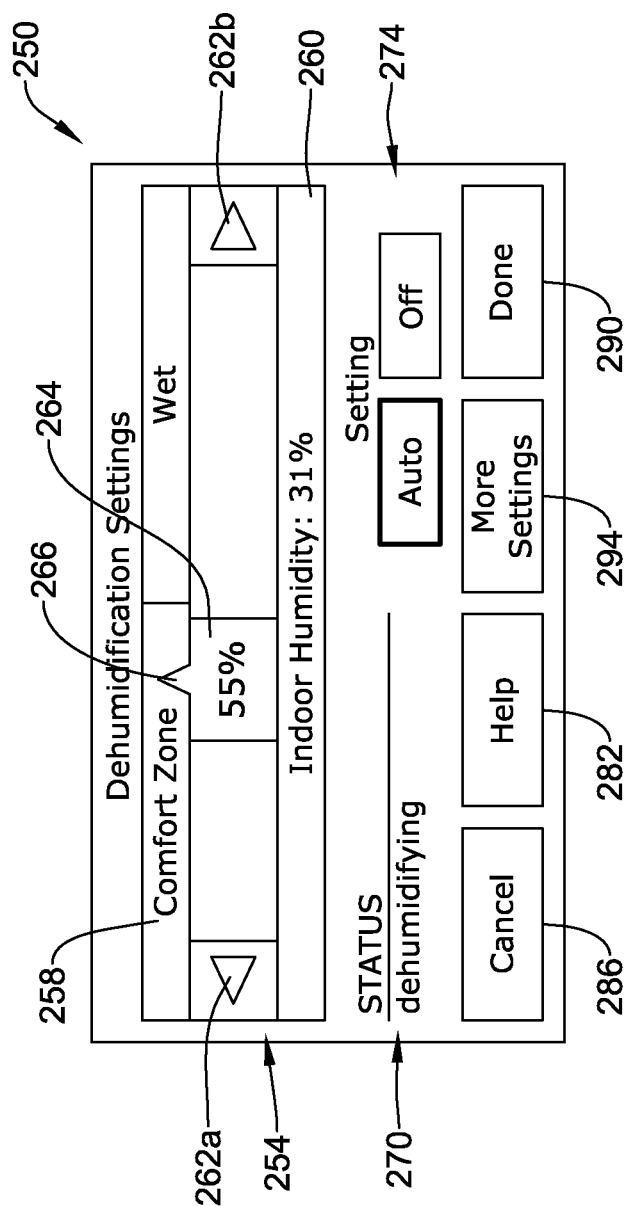
Figure 9:
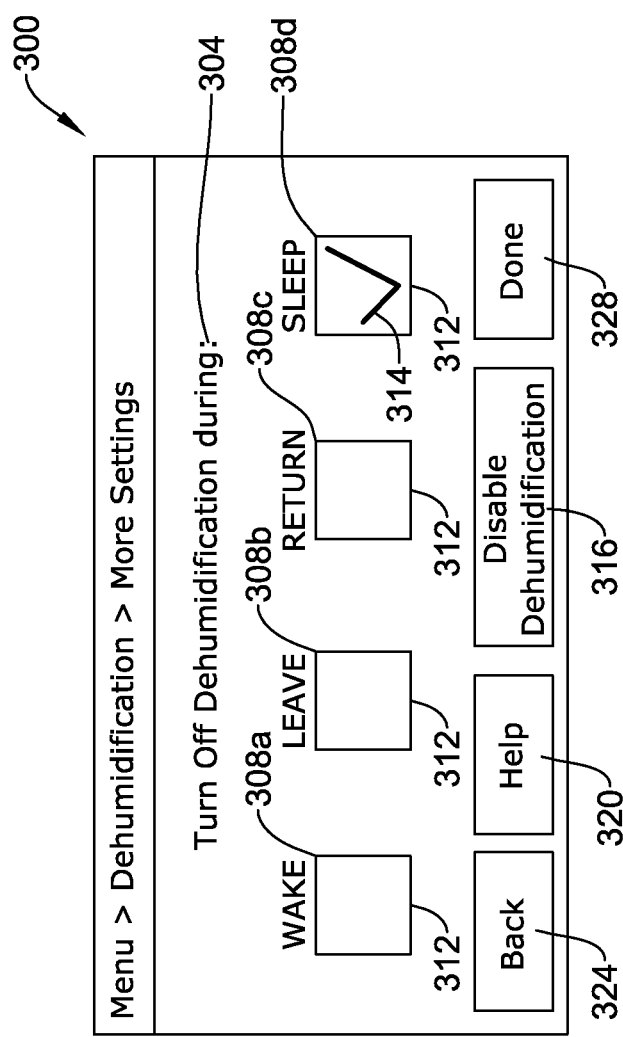

Referring back to FIG. 5, selection of the second menu option 108b labeled "Dehumidification" may cause HVAC controller 18 to display one or more screens related to dehumidification settings as show in FIGS. 8 and 9. FIG. 8 shows a first dehumidification settings screen 250 through which a user may select and/or set a dehumidification setting. HVAC controller 18 may, for example, use the dehumidification setting to control a dehumidifier such as a whole-house dehumidifier. HVAC controller 18 may, for example, display a parameter adjustment element for use in adjusting an operating parameter such as dehumidification, the parameter adjustment element may include an indicator that provides a qualitative indication for at least the current setting of the operating parameter. For example, as shown in the illustrative example provided in FIG. 8, screen 250 includes a slider bar 254 that has a scale 258, a display 260, and first and second arrows 262a, 262b. Scale 258 can be seen as including text describing the humidification setting in relative or qualitative terms such as "Wet" and "Comfort Zone". These particular terms are merely representative, as other terms may also be used. More generally, scale 258 may provide a qualitative context to a particular humidity value (e.g. 55%) so that a user unfamiliar with humidity values can still choose an appropriate humidity setting. Display 260 may, as illustrated, provide a reminder that it is the indoor humidity setting that is being displayed as well as a current indoor humidity setting or current indoor humidity reading. Slider bar 254 may be seen as including an indicator button 264 that may be moved left and/or right using first and second arrow keys 262a, 262b, as desired. Indicator button 264 may, with respect to scale 258, provide a visual indication of the relative or qualitative humidity setting and may, if desired, include a pointer 266 that interacts with scale 258. Scale 258 may also provide upper and/or lower numerical limits for the displayed parameter, but this is not required. In some instances, indicator button 264 may include a numerical representation (quantitative value) of the indoor humidity setting.

Screen 250 may also indicate a current dehumidification status in a first region 270 and a current operational setting in a second region 274. For example, as shown, the current dehumidification status is indicated as "dehumidifying" and the current operational setting is indicated as "auto" (i.e. automatic). Additionally, screen 250 may include a Help button 282, a Cancel button 286, and a Done button 290. Help button 282, when selected, may cause HVAC controller 18 to display further information explaining dehumidification, providing clarification regarding options, and the like. Cancel button 286, when selected, may cause HVAC controller 18 to display a previous screen such as, for example menu screen 100 of FIG. 5. Done button 290, when selected, may inform HVAC controller 18 that the dehumidification setting has been completed, and as a result, may display menu screen 100 (FIG. 5) or, in some cases, home screen 72 (FIG. 4).

Screen 250 may also include a button 294 labeled "More Settings" or "Advanced Settings," that when selected, may cause HVAC controller 18 to display a second dehumidification settings screen 300, such as shown in FIG. 9. As shown in FIG. 9, screen 300 may include a user prompt 304 that may prompt a user to select one or more time periods in which the dehumidification unit may be turned off and will not operate. A user may desire to turn off the dehumidification unit or operate the dehumidification unit at a reduced level for energy conservation during certain periods due to noise of operation, energy costs during peak demand times, and/or according to user preference. As shown, screen 300 may include a one or more individually selectable options 308a-308d, each option 308a-308d corresponding to a time period of an operating schedule of the HVAC system 4 stored in the controller memory 52 of HVAC controller 18.

For example, screen 300 includes a first option 308a corresponding to a Wake period, a second option 308b corresponding to a Leave period, a third option 308c corresponding to a Return period, and a fourth option 308d corresponding to a Sleep period. The options 308a-308d that may be displayed for selection by the user may be dependent of the operating schedule stored in the controller memory 52. It will be understood that fewer or more selectable options 308a-308d may be displayed corresponding to the number of time periods as determined by the schedule. It will also be understood that different identifiers and/or labels may be used to identify each of the different time periods available for selection. For example, in some cases, a first option may correspond to Period 1, a second option may correspond to Period 2, and third option may correspond to Period 3, and so on. These are just some examples.

A user may select a least one of the displayed options 308a-308d, each of the different options 308a-308d corresponding to a different time period of the schedule. Selection of one option may not affect selection of another subsequent option. Each of the options 308a-308d may include a selection indicator box 312 that, when selected by a user, may include a checkmark, an X, may be filled in, greyed out, or otherwise highlighted to indicate selection of that option. In the example shown, fourth option 308b, corresponding to the Sleep time period of the operating schedule stored in the memory 52 of the HVAC controller 18, includes a check mark 314 indicating selection. The dehumidification unit will continue operating according to a dehumidification setting during the time periods corresponding to the non-selected options, and the dehumidification unit will be turned off or otherwise discontinued during the time periods corresponding to the selected options. For example, according to the illustrative example shown in FIG. 9, the dehumidification unit will continue operating according to the dehumidification setting(s) during the Wake, Return and Leave time periods of the schedule stored in the controller memory 52, but will be turned off during the Sleep time period.

In some cases, a user may desire to disable the dehumidification unit for all time periods. As such, screen 300 may include an option 316 for disabling dehumidification that, when selected, may cause HVAC controller 18 to turn off the dehumidification unit regardless of time period. In some cases, option 316 may have a toggle feature such that, when selected again, may cause HVAC controller 18 to resume operating of the dehumidification.

Screen 300 may also include a Help button 320, a Back button 324, and a Done button 328. Help button 320, when selected, may cause HVAC controller 18 to display further information explaining dehumidification, providing clarification regarding options, and the like. Back button 324, when selected, may cause HVAC controller 18 to display a previous screen such as, for example menu screen 100 of FIG. 5. Done button 328, when selected, may inform HVAC controller 18 that the dehumidification setting has been entered, and as a result, HVAC controller 18 may display menu screen 100 (FIG. 5) or, in some cases, home screen 72 (FIG. 4). While screen 300 shows an example where that allows a user to select those time periods when the dehumidifier unit will not operate, it should be understood that a similar screen may be provided that allows a user to select those time period when the dehumidifier unit will be enabled and may operate.

Figure 10:
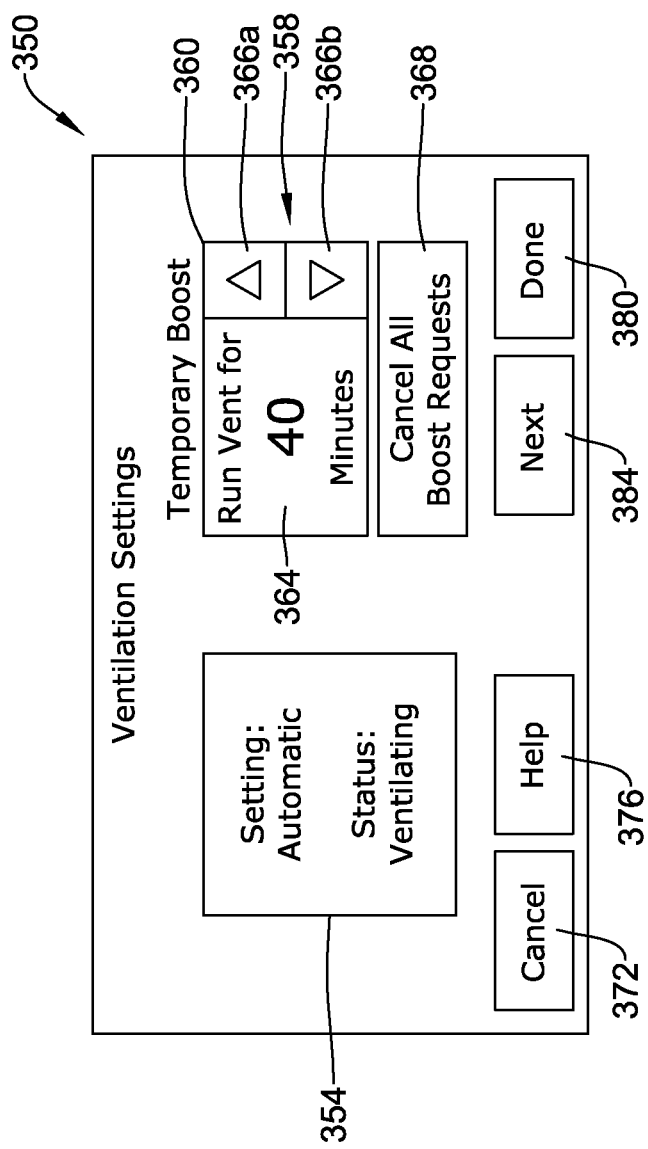

Referring again back to FIG. 5, selection of the third menu option 108c labeled "Ventilation" may cause HVAC controller 18 to display a sequence of one or more screens related to the ventilations settings for the HVAC system 4, as best show in FIGS. 10-13. FIG. 10, for example, provides an example of a first ventilation settings screen 350. As shown in FIG. 10, ventilation settings screen 350 may include a first region 354 that may identify the current ventilation setting (e.g. automatic) and/or a current ventilation status (e.g. ventilating). Ventilation control screen 350 may also provide one or more selectable options for requesting and/or cancelling a ventilation boost in a second region 358. In the example provided in FIG. 10, the second region 358 of ventilation settings screen 350 includes a box 360 that may display a temporary ventilation boost time 364, and first and second arrows 366a, 366b for increasing or decreasing the temporary ventilation boost time 364 displayed in the box 360. In some cases, the temporary ventilation boost time 364 may be increased or decreased in increments of 5, 10, 15, or 20 minutes using the first and second arrow keys 366a, 366b. Second region 358 may also include an additional selectable option 368 for cancelling the temporary ventilation boost request received via ventilation control screen 350 and/or ventilation boost requests received from one or more remotely located ventilation boost control units (if provided).

Ventilation settings screen 350 also may include a Cancel or Back button 372, a Help button 376, and a Done button 380. Cancel button 372, when selected, may cause HVAC controller 18 to display a previous screen such as, for example menu screen 100 of FIG. 5. Help button 376, when selected, may cause HVAC controller 18 to display further information explaining ventilation, providing clarification regarding screen options, and the like. Done button 380, when selected, may inform HVAC controller 18 that the ventilation setting has been completed, and as a result, HVAC controller 18 may display menu screen 100 (FIG. 5) or, in some cases, home screen 72 (FIG. 4).

Figure 11:
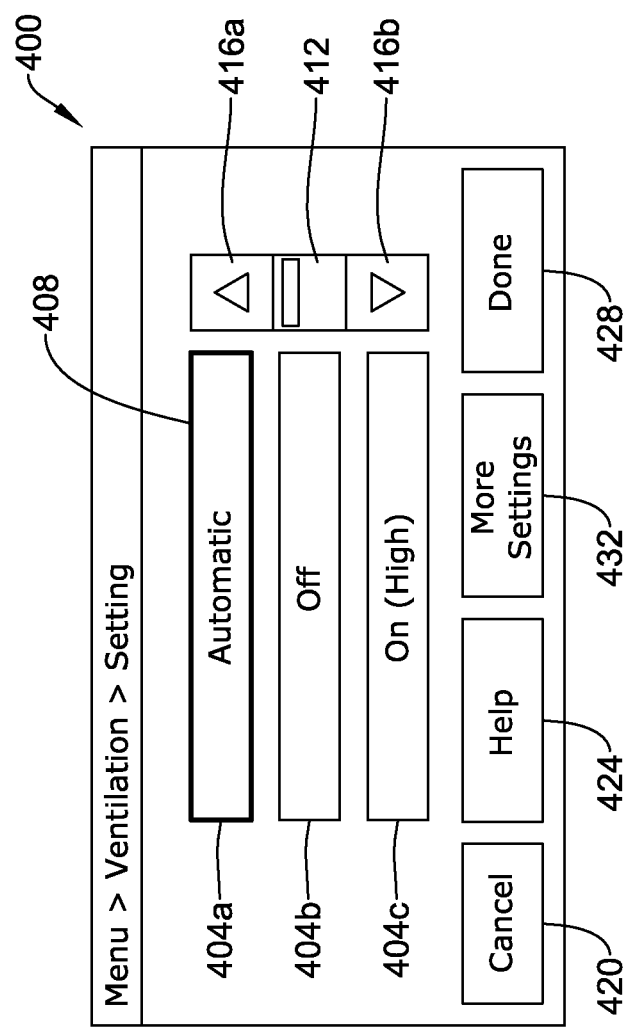

In some cases, ventilation settings screen 350 may also include a Next button 388. Selection of the Next button 388 may cause HVAC controller 18 to display an additional ventilation settings screen, such as ventilation setting screen 400 of FIG. 11. As shown in FIG. 11, ventilation settings screen 400 may display one or more ventilation options 404 corresponding to one or more different operating modes for the ventilation unit. For example, screen 400 may display a first option 404a labeled "Automatic" and corresponding to an automatic operating mode for the ventilation unit, a second option 404b labeled "Off" and corresponding to an "off" mode for the ventilation unit, and a third option 404c labeled "ON (High)" and corresponding to an "on" mode for the ventilation unit with the fan speed set at high. The options 404 may be displayed in a table 408. In some cases, additional options corresponding to additional operating modes of the ventilation unit may be provided in which case table 408 may be a scrollable table 408 and may include a scroll bar 412 having first and second arrow keys 416a, 416b for navigating the table 408. For example, another option labeled "ON (Low)" may be provided that corresponds to an "on" mode for the ventilation unit with the fan speed set at low. Another option labeled "Intermittent" may be provided that corresponds to turning the ventilation unit on for approximately 20 minutes of every hour. These are just some examples.

Ventilation settings screen 400 also may also include a Cancel or Back button 420, a Help button 424, and a Done button 428. Cancel button 420, when selected, may cause HVAC controller 18 to display a previous screen such as, for example menu screen 100 of FIG. 5. Help button 424, when selected, may cause HVAC controller 18 to display further information explaining ventilation, providing clarification regarding screen options, and the like. Done button 428, when selected, may inform HVAC controller 18 that the ventilation setting has been completed, and as a result, may display menu screen 100 (FIG. 5) or, in some cases, home screen 72 (FIG. 4).

Figure 12:
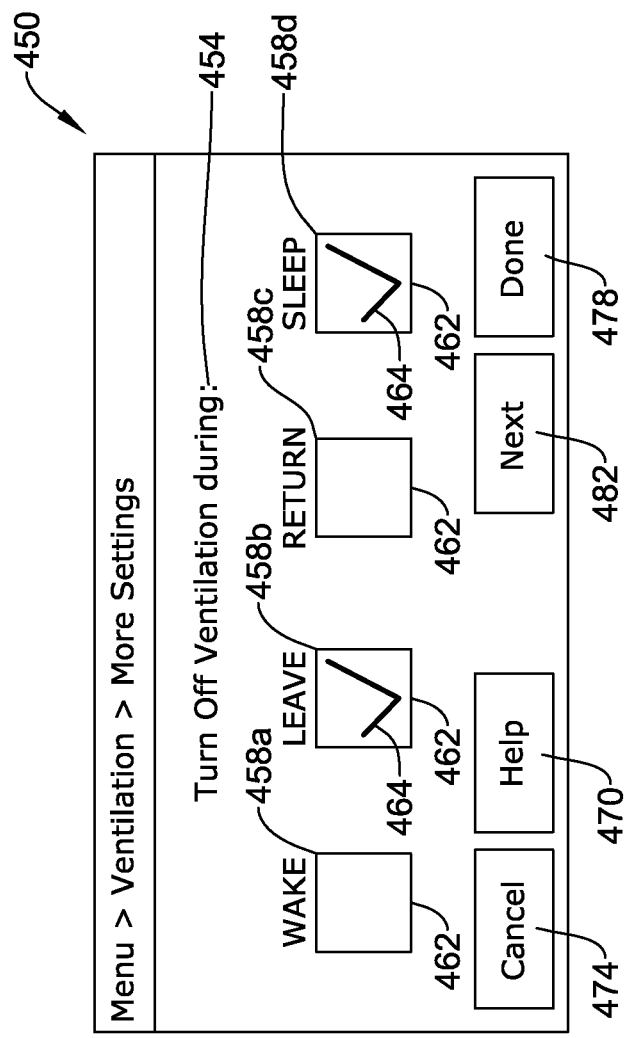

In some cases, ventilation settings screen 400 may also include a button 432 labeled "More Settings" or "Advanced Settings". Selection of the button 432 may cause HVAC controller 18 to display another screen, such as 450 of FIG. 12. As shown in FIG. 12, screen 450 may include a user prompt 454 which may prompt a user to select one or more time periods in which a ventilation unit may be turned off and will not operate. A user may desire to turn off the ventilation unit or operate the ventilation unit at a reduced level for energy conservation during certain periods due to noise of operation, high energy costs during peak demand times, and/or according to user preference. As shown, screen 450 may include a one or more individually selectable options 458a-458d, each option 458a-458d corresponding to a time period of an operating schedule of the HVAC system 4 stored in the controller memory 52 of HVAC controller 18. For example, screen 450 may include a first option 458a corresponding to a Wake period, a second option 458b corresponding to a Leave period, a third option 458c corresponding to a Return period, and a fourth option 458d corresponding to a Sleep period. The options 458a-458d that may be displayed for selection by the user may be dependent on the operating schedule stored in the controller memory 52. It will be understood that fewer or more selectable options 458a-348d may be displayed corresponding to the number of time periods as determined by the schedule. Additionally, it will be understood that different identifiers and/or labels may be used to identify each of the different time periods available for selection. For example, in some cases, a first option may correspond to Period 1, a second option may correspond to Period 2, and third option may correspond to Period 3, and so on. These are just some examples.

A user may select a least one of the displayed options 458a-458d, each of the different options 458a-458d corresponding to a different time period of the schedule. Additionally, selection of one option may not affect selection of another subsequent option. Each of the options 458a-458d may include a selection indicator box 462 that, when selected by a user, may include a checkmark (shown), an X, may be filled in, greyed out, or otherwise highlighted to indicate selection of that option. For example, second option 458b corresponding to the Leave time period and fourth option 458d corresponding to the Sleep time period of the operating schedule stored in the memory 52 of the HVAC controller 18 include a check mark 464 indicating selection. In this example, the ventilation unit will continue operating according to a ventilation setting (e.g. automatic, on (high), on (low), Intermittent) during the time periods corresponding to the non-selected options, and the ventilation unit will be turned off or otherwise discontinued during the time periods corresponding to the selected options. For example, according to the illustrative exampled shown in FIG. 12, the ventilation unit will continue operating according to the ventilation setting during the Wake and Return time periods of the schedule stored in the controller memory 52, but will be turned off during the Leave and Sleep time periods.

Screen 450 may also include a Help button 470, a Cancel or Back button 474, and a Done button 478. Help button 470, when selected, may cause HVAC controller 18 to display further information explaining ventilation, providing clarification regarding screen options, and the like. Cancel button 474, when selected, may cause HVAC controller 18 to display a previous screen such as, ventilation settings screen 400 of FIG. 11 or screen 350 of FIG. 10. Done button 478, when selected, may inform HVAC controller 18 that the ventilation setting has been completed, and as a result, HVAC controller 18 may display menu screen 100 (FIG. 5) or, in some cases, home screen 72 (FIG. 4). While screen 450 shows an example where that allows a user to select those time periods when the ventilation unit will not operate, it should be understood that a similar screen may be provided that allows a user to select those time period when the ventilation unit will be enabled and may operate.

Figure 13:
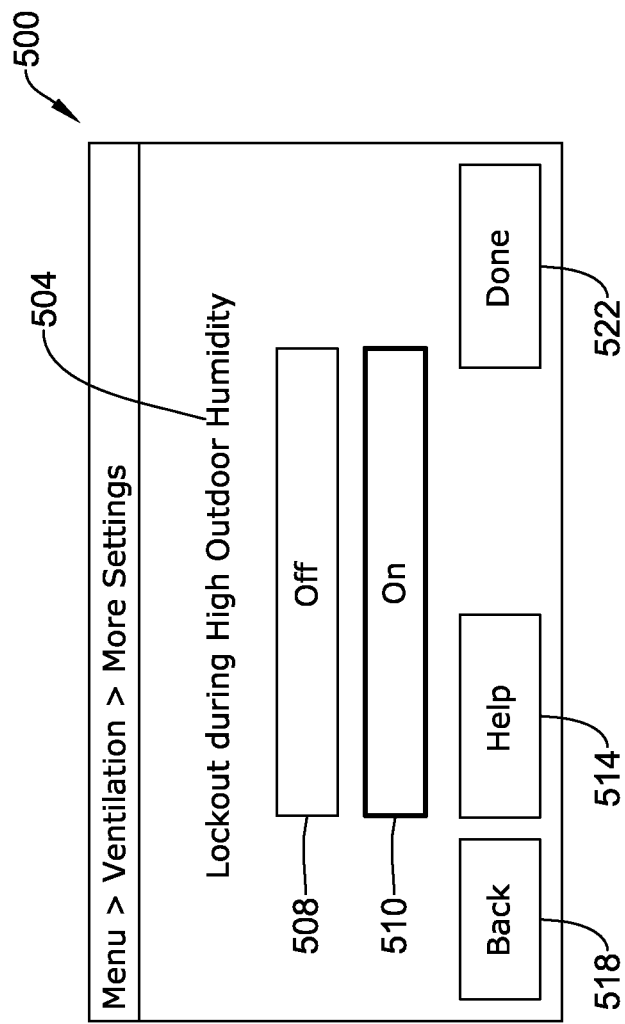

In some cases, screen 450 may also include a Next button 482 that, when selected may cause HVAC controller to display another ventilation settings screen, such as additional ventilation setting screen 500 shown in FIG. 13. As shown in FIG. 13, ventilation settings screen 500 may include a user prompt 504 that may prompt a user to active or deactivate a ventilation lockout feature during periods of high outdoor humidity. For example, ventilation settings screen 500 may display a first option 508 labeled "Off" for deactivating a ventilation lockout, and a second option 510 labeled "On" for activating a ventilation lockout during periods of high outdoor humidity. Selection of the first option 508 labeled "Off" will cause the HVAC controller 18 to not deactivate the ventilation unit when the outdoor humidity rises above a threshold humidity value. Selection of the second option 510 labeled "On" will cause the HVAC controller 18 to deactivate the ventilation unit when the outdoor humidity rises above a threshold humidity value.

Screen 500 may also include a Help button 514, a Cancel or Back button 518, and a Done button 522. Help button 514, when selected, may cause HVAC controller 18 to display further information explaining ventilation lockouts, providing clarification regarding screen options, and the like. Back button 518, when selected, may cause HVAC controller 18 to display a previous screen such as, for example, ventilation settings screen 450 of FIG. 12. Done button 522, when selected, may inform HVAC controller 18 that the ventilation setting has been completed, and as a result, HVAC controller 18 may display menu screen 100 (FIG. 5) or, in some cases, home screen 72 (FIG. 4).

Figure 14:
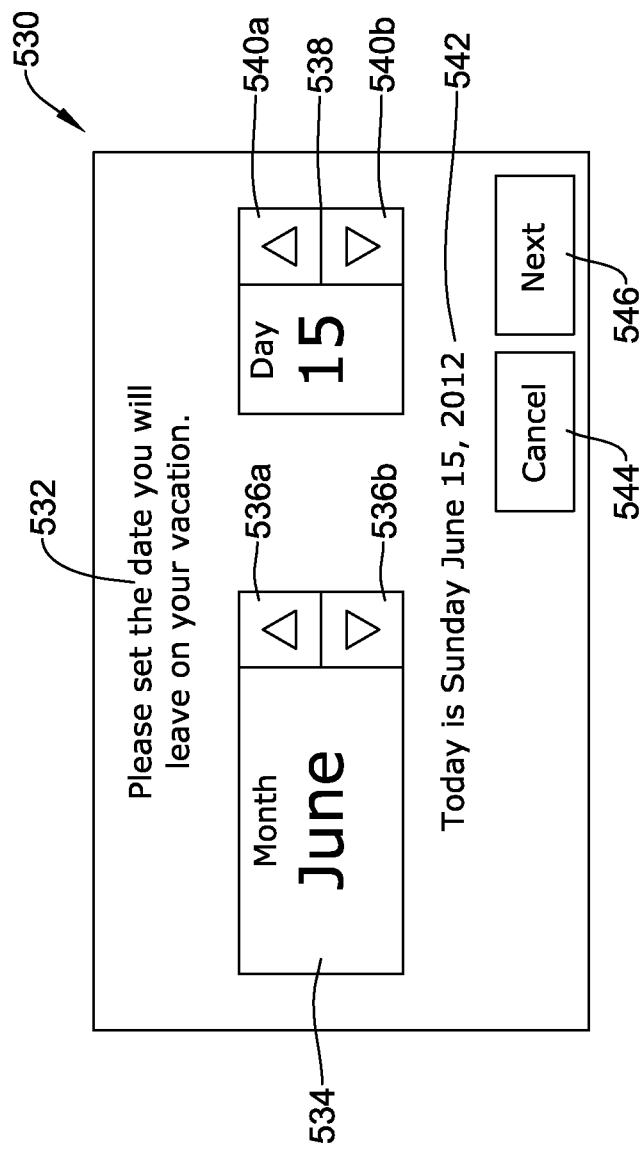
Figure 15:
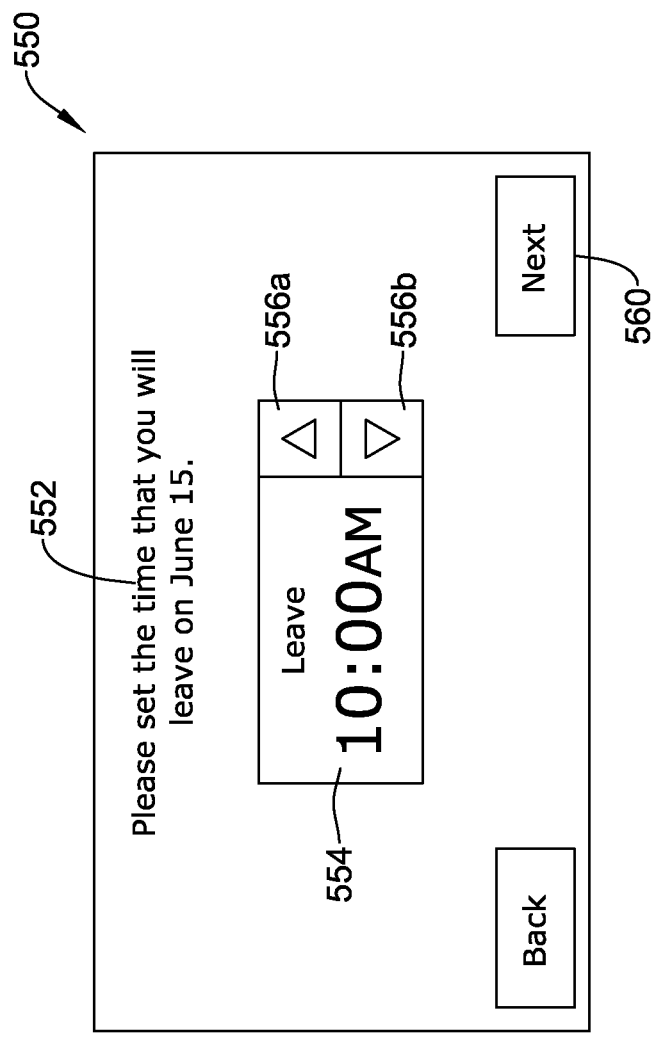

Referring back to FIG. 5, selection of the fourth menu option 108d labeled "Vacation Mode" may cause HVAC controller 18 to display a sequence of one or more screens, such as shown in FIGS. 14-24, that may guide a user through designating different parameters and operational modes to be maintained during an extended period of time in which a user may be away from the building (e.g. vacation). In the example provided, FIG. 14 displays a first screen 530 of a sequence of screens related to a vacation mode of the HVAC controller 18. First screen 530 may include a user prompt 532 that may prompt a user to set the date on which their vacation period will begin. As shown in FIG. 14, first screen 530 includes a first box 534 including first and second arrow keys 536a, 536 for selecting the month a second box 538 including first and second arrow keys 540a, 540b for selecting the day on which the vacation period will begin. First screen 530 may also display the current date in a region 542 above or below the first and second boxes 534, 538. Additionally, screen 530 may include a Cancel or Back button 542 and a Next button 544. Cancel button 542, when selected, may cause HVAC controller 18 to display a previous screen such as, for example, menu screen 100 of FIG. 5. Selection of the Next button 544 may cause HVAC controller 18 to display a next screen 550 in the sequence of screens related to the vacation mode of the HVAC system, such as shown in FIG. 15.

Screen 550 may include a user prompt 552 that may prompt the user to set the time at which the vacation period will begin. As shown in FIG. 15, screen 550 may include a box 554 displaying a time and first and second arrow keys 556a, 556b, for adjusting the time displayed in the box 554 to the time at which the vacation period will begin. In addition, screen 550 may include a Back button 558 that, when selected, may cause HVAC controller 18 to display the previous screen (e.g. screen 530 of FIG. 14). Screen 550 also may include a Next button 560 that, when selected, may cause HVAC controller 18 to display the next screen 562 in the sequence of screens related to the vacation mode of the HVAC system, such as shown in FIG. 16.

Figure 16:
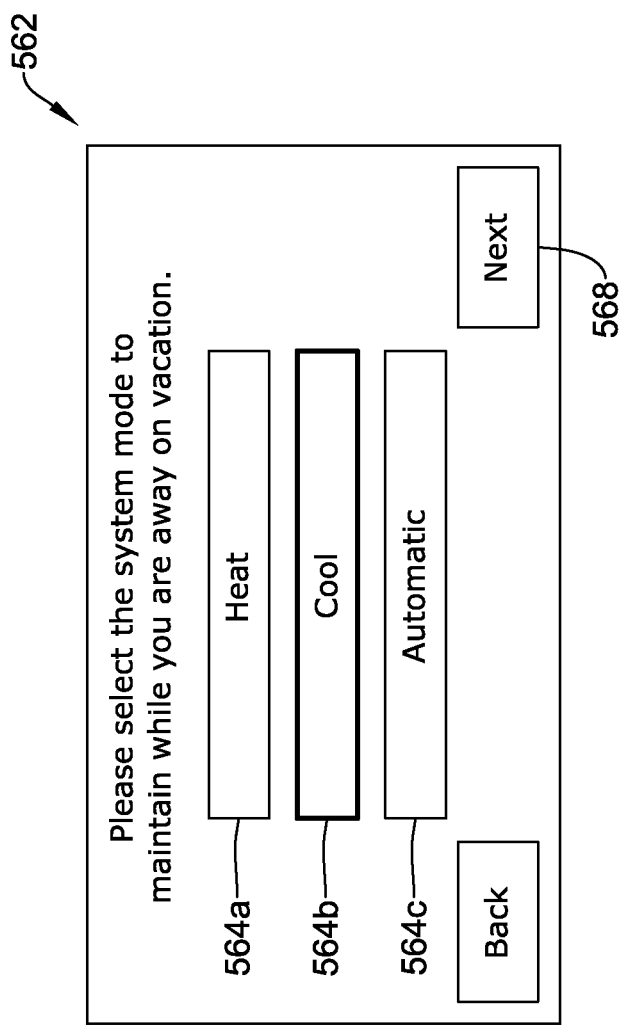

FIG. 16 shows an illustrative example of a screen 562 that may be displayed on the display 62 of HVAC controller 18 through which a user may select which operational mode of the HVAC system is to be maintained during the user's vacation period. As shown, screen 562 may include a user prompt that may prompt the user to select an operating mode of the HVAC system to maintain during the user's vacation period. Screen 562 may display one or more options 564a-564c, each option 564a-564c corresponding to an available operational mode for the HVAC system 4. In some cases, screen 562 may display a first option 564a corresponding to a heating mode, a second option 564b corresponding to a cooling mode, and a third option 564c corresponding to an automatic mode. Upon selection of the desired mode by a user, the selected option may be bolded, greyed out, include a different border, or otherwise highlighted to indicate selection by the user. For example, in the example shown, the second option 564b corresponding to the cooling mode is bolded indicating selection by the user. After selection of the desired operating mode, the user may select the Next button 568 to advance to a next screen 570 within the sequence of screens related to the vacation mode, such as shown in FIG. 17.

Figure 17:
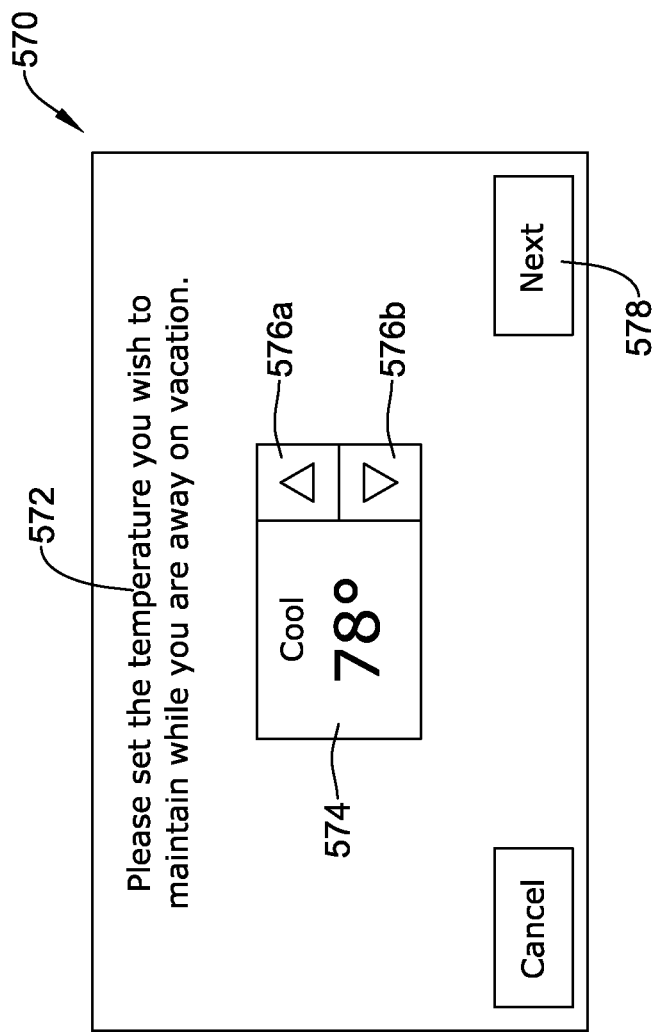

FIG. 17 provides an illustrative example of a screen 570 through which a user may enter and set a temperature to be maintained during the vacation time period. Screen 570 may include a user prompt 572 that may prompt the user to adjust and set a temperature set point to be maintained while away on vacation. As shown in FIG. 17, screen 570 may include a box 574 that displays a temperature corresponding to the operating mode selected through the previous screen (e.g. screen 562 of FIG. 16), and first and second arrow keys 556a, 556b for adjusting the temperature displayed in the box 574. Selection of the Next button 578 may cause HVAC controller 18 to accept the temperature set point entered by the user in box 574, and may cause HVAC controller 18 to display yet another screen 580 in the sequence of screens related to the vacation mode of the HVAC system 4, such as shown in FIG. 18.

Figure 18:
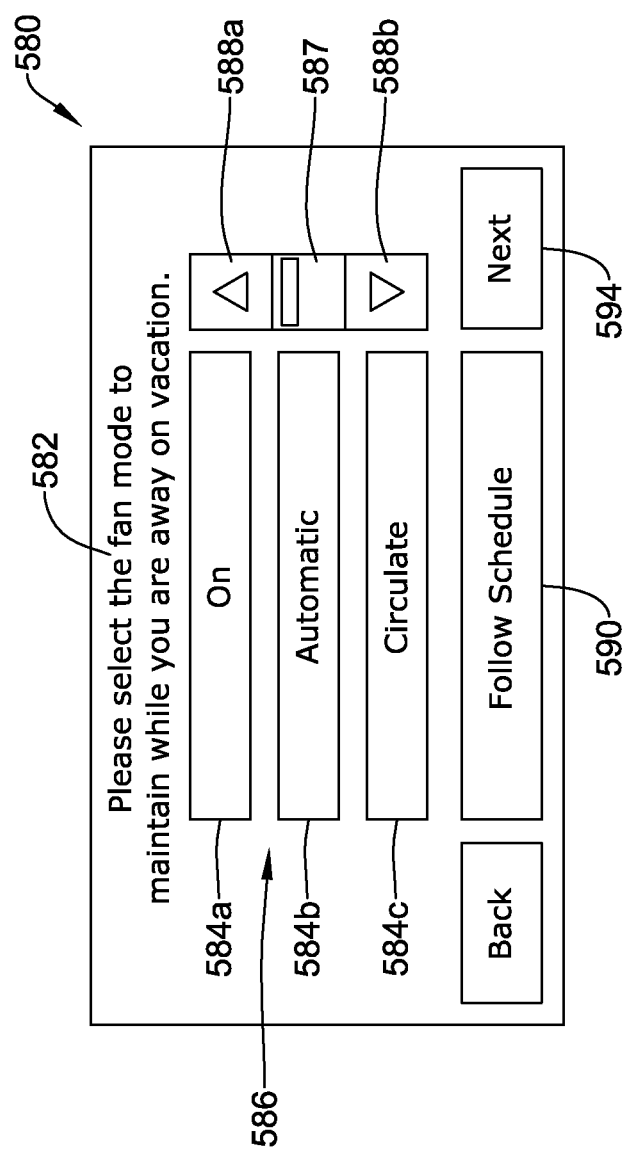

FIG. 18 provides an example of a screen 580 that may be displayed on the display 62 of HVAC controller 18 through which a user may select a fan mode to be maintained during the user's vacation period. As shown in FIG. 18, screen 580 may include a user prompt 582 that may prompt the user to select a fan mode to be maintained during the vacation. Screen 580 may display one or more selectable options 584a-584c, each option 584a-584c corresponding to an available fan mode for the HVAC system 4. In some cases, the one or more selectable options 584a-584c may be displayed in a table 586. Table 586 may be a scrollable table in which case a scroll bar 587 including first and second arrow keys 588a, 588b may be provided for navigating the different options corresponding to each of the available fan modes displayed in table 586. In some cases, screen 580 may display an additional fan option 590 for following a predetermined fan mode schedule stored in the controller memory 52 of HVAC controller 18, but this is not required. Upon selection by the user of the desired fan mode to be maintained during the vacation period, the selected option may be bolded, greyed out, include a different border, or otherwise highlighted to indicate selection by the user. For example, in the example shown, the second option 584b corresponding to an automatic fan mode is bolded indicating selection by the user. After selection of the desired fan mode, the user may select the Next button 594 to advance to another screen 600 within the sequence of screens related to the vacation mode, such as shown in FIG. 19.

Figure 19:
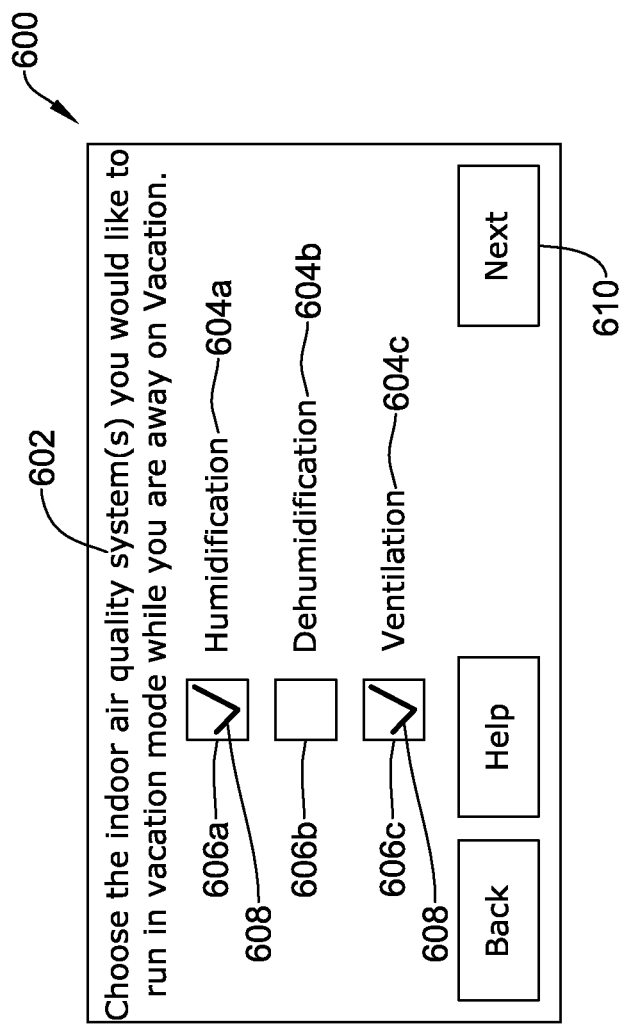

FIG. 19 shows an example of a screen 600 that may be displayed on the display 62 of HVAC controller 18 through which a user may select one or more operations for maintaining the indoor air quality within the building 2 during the vacation period. In the example shown, screen 600 includes a user prompt 602 that prompts the user to select which indoor air quality operations are to be maintained while the user is away on vacation. Screen 600 may display one or more individually selectable options 604a-604c, each option 604a-604c corresponding to an available indoor air quality operation of the HVAC system 4. For example, screen 600 may display a first option 604a corresponding to humidification, a second option 604b corresponding to dehumidification, and a third option 604c corresponding to ventilation. In some cases, only the indoor air quality operations corresponding to the indoor air quality units included in the HVAC system 4 may be displayed. For example, if the HVAC system 4 does not include a dehumidifier unit, an option corresponding to dehumidification may not be displayed.

Figure 20:
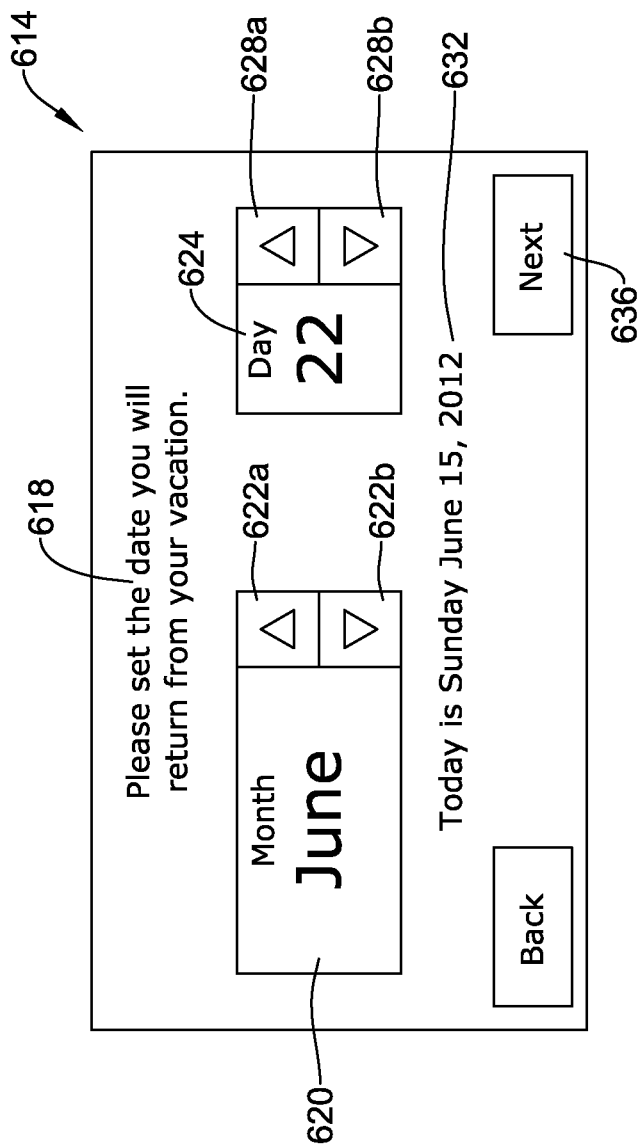

A user may select zero or more of the displayed options 604a-604c, each of the different options 604a-604c corresponding to a different indoor air quality operation of the HVAC system 4. In the example shown, selection of one option may not affect selection of another subsequent option. Each of the options 604a-604c may include a selection indicator box 606 that, when selected by a user, may include a checkmark, an X, may be filled in, greyed out, or otherwise highlighted to indicate selection of that option. For example, first option 604a corresponding to humidification and third option 604c corresponding to ventilation each include a check mark 608 indicating selection. In this instance, the HVAC system 4 will operate the humidification and ventilation units according to a vacation mode or setback mode in which the HVAC system 4 may maintain humidification and ventilation at reduced levels to conserve energy. Dehumidification of the building 2 may continue as normal. Selection of the Next button 610 may cause HVAC controller 18 to display another screen 614 within the sequence of screens related to the vacation mode, such as shown in FIG. 20.

Through screen 614, a user may select and enter a date on which the user's vacation period will end. In some cases, screen 614 may include a user prompt 618 that may prompt a user to set the date on which their vacation period will end. Screen 614 may have a first box 620 including first and second arrow keys 622a, 622b for selecting the month, and a second box 624 including first and second arrow keys 628a, 628b for selecting the day on which the vacation period will end. Screen 614 may also display the current date in a region 632 above or below the first and second boxes 620, 624. Selection of the Next button 636 may cause HVAC controller 18 to display the next screen 640 in the sequence of screens related to the vacation mode of the HVAC system, such as shown in FIG. 21.

Figure 21:
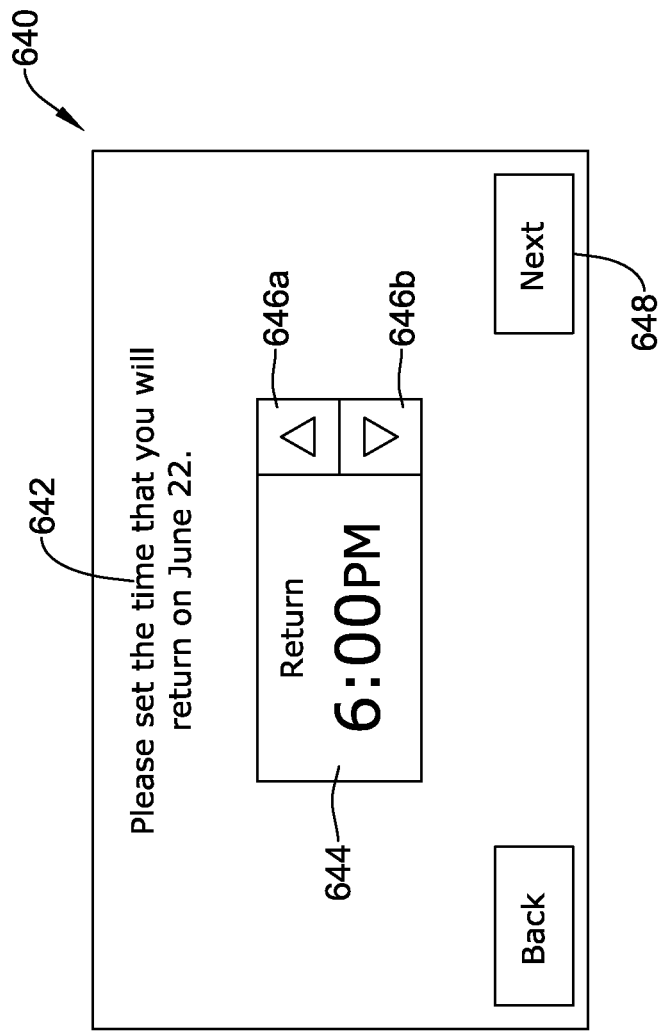

Through screen 640, as shown in FIG. 21, a user may set the time at which the user's vacation period will end. In some cases, screen 640 may include a user prompt 642 that may prompt the user to set the time at which the vacation period will end. Additionally, screen 640 may include a box 644 displaying a time and first and second arrow keys 646a, 646b for adjusting the time displayed in the box 644. Screen 644 also may include a Next button 648 that, when selected, may cause HVAC controller to accept the time entered by the user, and to display another screen 660 in the sequence of screens related to the vacation mode of the HVAC system, such as shown in FIG. 22.

Figure 22:
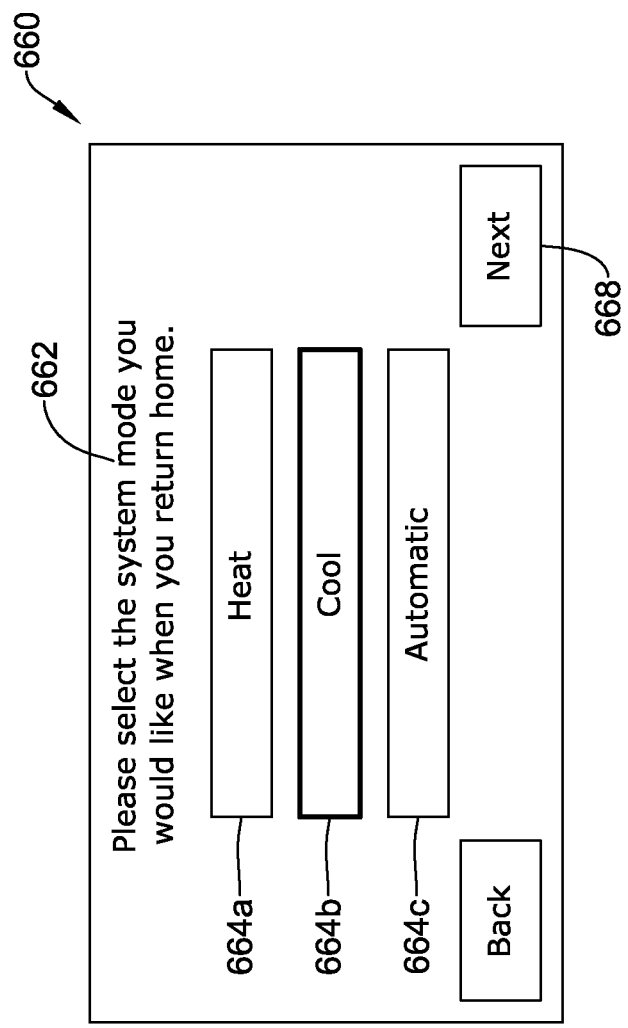

FIG. 22 shows an example screen 660 that may be displayed on the display 62 of HVAC controller 18 through which a user may select which operational mode of the HVAC system 4 to be maintained upon the user's return at the end of the vacation period. As shown, screen 660 may include a user prompt 662 that may prompt the user to select an operating mode of the HVAC system to be maintained upon the user's return. Screen 660 may display one or more options 664a-664c, each option 664a-664c corresponding to an available operational mode for the HVAC system 4. In some cases, screen 660 may display a first option 664a corresponding to a heating mode, a second option 664b corresponding to a cooling mode, and a third option 664c corresponding to an automatic mode. Upon selection of the desired mode by a user, the selected option may be bolded, greyed out, include a different border, or otherwise highlighted to indicate selection by the user. For example, in the illustrative example, the second option 664b corresponding to the cooling mode is bolded indicating selection by the user. After selection of the desired operating mode, the user may select the Next button 668 to advance to the next screen 670 within the sequence of screens related to the vacation mode, such as shown in FIG. 23.

Figure 23:
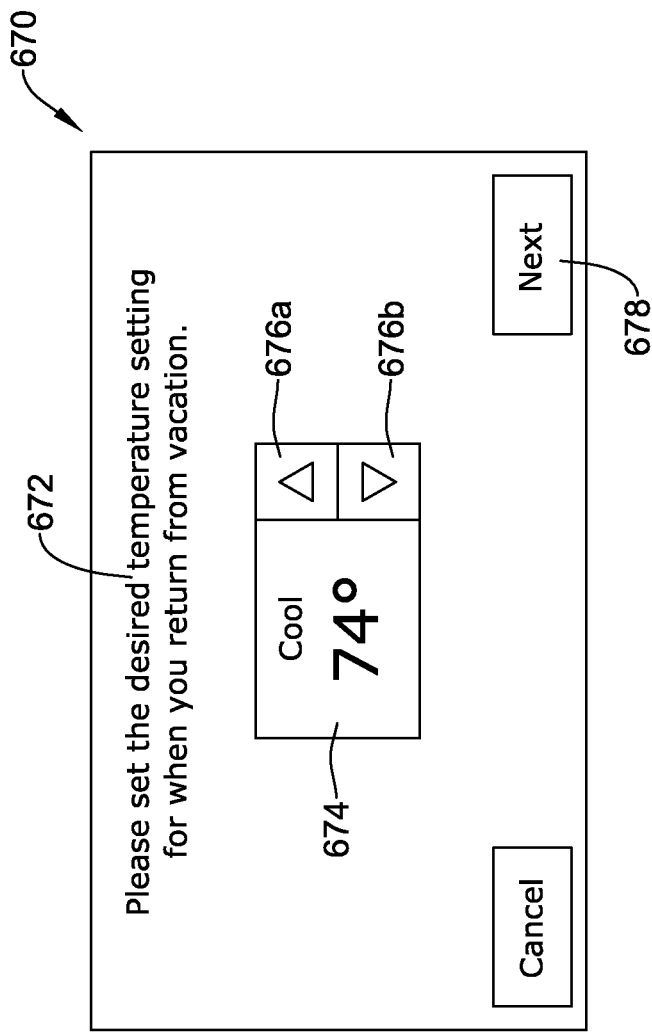

FIG. 23 provides an illustrative example of a screen 670 through which a user may enter and set a temperature to be maintained upon their return at the end of the vacation period. Screen 670 may include a user prompt 672 that may prompt the user to adjust and set a temperature set point to be maintained upon the user's return. As shown in FIG. 23, screen 670 may include a box 674 displaying a temperature corresponding to the operating mode selected through the previous screen (e.g. screen 660 of FIG. 22) and first and second arrow keys 676a, 676b for adjusting the temperature displayed in the box 674 to the user's desired temperature. Selection of the Next button 678 may cause HVAC controller 18 to accept the temperature set point entered by the user, and cause HVAC controller 18 to display yet another screen 680 in the sequence of screens related to the vacation mode of the HVAC system 4, such as shown in FIG. 24.

Figure 24:
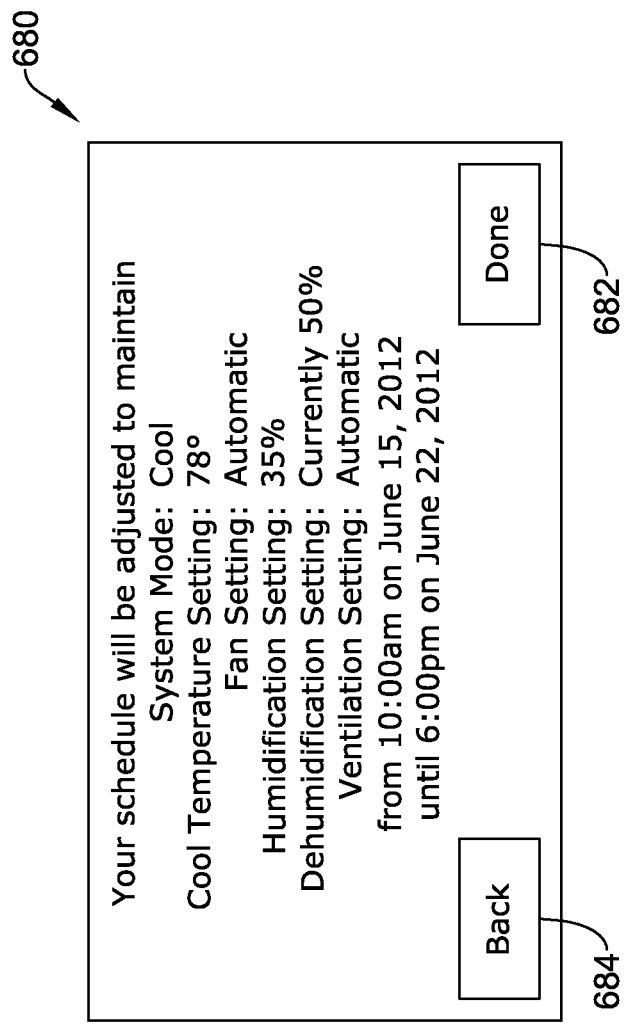

FIG. 24 provides an illustrative example of a summary screen 680 through which a user may review the settings related to the vacation period. The information displayed on the summary screen 680 may be in any suitable format. The summary page shown in FIG. 24 is just one example. If the data displayed on the summary screen 680 is acceptable to the user, the user may select Done button 682. Selection of Done button 682 may cause the HVAC controller 18 to accept each of the different operational settings corresponding to the vacation period, and may cause HVAC controller 18 to display home screen 72 as shown in FIG. 4. If any of the settings are not acceptable to the user, the user may user Back button 684 to navigate back through the sequence of screens discussed above to the appropriate screen or screens, making any adjustments as necessary or desired. While screens 562, 570, 580, 600, 614, 640, 660, and 670 generally relate to a cooling mode of the HVAC system 4, it will be understood that a similar set of screens may be displayed on the display 62 of HVAC controller 18 related to the heating mode or automatic mode.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. An HVAC controller configured to control one or more components of an HVAC system of a building, the HVAC controller comprising:
    a user interface including a display;
    a memory;
    a programmable operating schedule including two or more time periods and one or more temperature set points for each of the two or more time periods, the programmable operating schedule stored in the memory;
    an I/O block for sending and/or receiving signals to and/or from the one or more components of the HVAC system including one or more of a heating unit, an air conditioner unit, a humidifier unit, and a dehumidifier unit;
    a controller coupled to the user interface, the memory, and the I/O block, the controller configured to generate one or more signals to control one or more components of the HVAC system in accordance with the programmable operating schedule, the controller further configured to allow a user to program at least a first time period of the two or more time periods of the programmable operating schedule to control at least one of the humidifier unit and the dehumidifier unit differently than during at least one other of the two or more time periods of the programmable operating schedule; and
    wherein the controller is configured to allow a user to program the programmable operating schedule by allowing the user to:
       select a set point for the at least one of the humidifier unit and the dehumidifier unit;
       identify at least a first time period of the two or more time periods of the programmable operating schedule to not-operate the at least one of the humidifier unit and the dehumidifier unit in accordance with the selected set point, and to identify at least a second time period of the two or more time periods of the programmable operating schedule to operate the at least one of the humidifier unit and the dehumidifier unit in accordance with the selected set point; and
       wherein a plurality of the two or more time periods are displayed on a common screen on the display and the at least first time period is identified by selection of the first time period from the plurality of displayed time periods on the display, and the at least second time period is identified by non-selection of the second time period from the plurality of displayed time periods on the display;
    wherein the selection and non-selection of each of the plurality of the two or more time periods to operate and not operate the at least one of the humidifier unit and the dehumidifier unit in accordance with the selected set point are determinable from the common screen.

2. The HVAC controller according to claim 1, wherein the controller is configured to allow a user to identify which of the humidifier unit and the dehumidifier unit to operate during the first time period and/or which of the humidifier unit and the dehumidifier unit to not-operate during the second time period.

3. The HVAC controller according to claim 1, wherein the controller is configured to allow a user to program the programmable operating schedule by allowing the user to identify a first indoor air quality setting for the first time period of the two or more time periods of the programmable operating schedule, and to identify a second indoor air quality setting for the second time period of the two or more time periods of the programmable operating schedule, wherein the first indoor air quality setting is different from the second indoor air quality setting.

4. The HVAC controller according to claim 1, wherein the two or more time periods of the programmable operating schedule include a wake time period, a leave time period, a return time period, and a sleep time period.

5. The HVAC controller according to claim 1, wherein the controller is configured to display on the display of the user interface one or more screens related to a user's vacation schedule, wherein at least one of the one or more screens allows the user to identify one or more indoor air quality components to operate at a reduced level according to one or more indoor air quality settings in a mode associated with the user's vacation schedule.

6. The HVAC controller according to claim 1, wherein the controller is configured to store and display a user's indoor air quality setting of a mode corresponding to a user's vacation schedule for at least one indoor air quality component, and to display on the display of the user interface which indoor air quality component is to be operating in the mode corresponding to a user's vacation schedule.

7. The HVAC controller according to claim 1, wherein the HVAC controller is a thermostat including a temperature sensor.

8. The HVAC controller according to claim 1, wherein the controller is configured to allow a user to program at least a first time period of the two or more time periods of the programmable operating schedule to control the humidifier unit differently than during at least one other of the two or more time periods of the programmable operating schedule.

9. An HVAC controller configured to control one or more components of an HVAC system of a building, the HVAC controller comprising:
    a user interface including a display;
    a memory;
    an I/O block for sending and/or receiving signals to and/or from the one or more components of the HVAC system, including one or more of a heating unit, an air conditioning unit, and one or more indoor air quality components; and
    a controller coupled to the user interface, the memory, and the I/O block, the controller is configured to display a selector for each of the one or more indoor air quality components of the HVAC system on a common screen on the display and to allow a user to select which of the one or more indoor air quality components are to operate in a vacation mode during a user's vacation schedule by selecting the corresponding selector on the display and which of the one or more indoor air quality components are to operate in a normal mode during a user's vacation schedule by non-selection of the corresponding selector on the display, wherein the selection and non-selection of the corresponding selectors are determinable from the common screen.

10. The HVAC controller of claim 9, wherein the controller is further configured to operate one or more of the indoor air quality components differently during a first period of time than during a second period of time, wherein the first period of time and the second period of time are programmable by a user via the user interface of the HVAC controller, and one or more of the indoor air quality components are operated during the first period of time and are not operated during the second period of time.

11. The HVAC controller of claim 10, wherein the controller allows a user to select which of the one or more indoor air quality components are active during the first period of time and/or which of the one or more indoor air quality components are active during the second period of time.

12. The HVAC controller according to claim 10, wherein the second period of time corresponds to the user's vacation schedule.

13. The HVAC controller of claim 9, wherein the controller is further configured to operate one or more of the indoor air quality components differently during a first period of time than during a second period of time, wherein the first period of time and the second period of time are programmable by a user via the user interface of the HVAC controller, and one or more of the indoor air quality components are operated using a first indoor air quality setting during the first period of time and are operated using a second indoor air quality setting during the second period of time.

14. The HVAC controller of claim 13, further comprising:
a programmable operating schedule including two or more time periods and one or more temperature set points for each of the two or more time periods, the programmable operating schedule stored in the memory; and
wherein the first period of time corresponds to one of the two or more time periods of the programmable operating schedule, and the second period of time corresponds to another one of the two or more time periods of the programmable operating schedule.

15. The HVAC controller according to claim 9, wherein at least one of the one or more indoor air quality components is a humidifier unit, a dehumidifier unit or a ventilation unit.

16. A method of controlling an HVAC system including one or more of a heating unit, an air conditioner unit, a humidifier unit, and a dehumidifier unit, the method comprising:
receiving two or more temperature set points corresponding to two or more time periods related to a user's schedule at the user interface of a thermostat;
displaying a selector for each of the two or more time periods on a common screen of a display of the user interface of the thermostat, wherein non-selection of one or more of the selectors for the two or more time periods displayed on the common screen identifies the time periods during which the humidifier unit or the dehumidifier unit will operate in accordance with a set point; and
receiving a user's input at the user interface of the thermostat to select the selector for at least one but less than all of the two or more time periods of the user's schedule during which at least one of the humidifier unit and the dehumidifier unit will not operate in accordance with any set point, wherein the selection and non-selection of the corresponding selectors are determinable from the common screen.

17. The method of claim 16, wherein the user's input includes making an overt selection of the selector for at least one but less than all of the two or more time periods.

18. The method of claim 16, wherein the user's input includes not overtly selecting the selector of at least one but less than all of the two or more time periods.

* * * * *